United States Patent
Osawa et al.

(10) Patent No.: US 6,516,064 B1
(45) Date of Patent: Feb. 4, 2003

(54) SIGNAL RECORDING APPARATUS, SIGNAL RECORD MEDIUM AND SIGNAL REPRODUCING APPARATUS

(75) Inventors: Yoshitomo Osawa, Kanagawa (JP); Yoichiro Sako, Chiba (JP); Akira Kurihara, Kanagawa (JP); Isao Kawashima, Kanagawa (JP)

(73) Assignee: Sony Corporation, Tokyo (JP)

( * ) Notice: Subject to any disclaimer, the term of this patent is extended or adjusted under 35 U.S.C. 154(b) by 1118 days.

(21) Appl. No.: 08/677,543

(22) Filed: Jul. 10, 1996

(30) Foreign Application Priority Data

Jul. 25, 1995 (JP) .......................... 07-189309

(51) Int. Cl.$^7$ ............................... H04N 7/167
(52) U.S. Cl. .................. 380/201; 380/277; 380/287; 713/189; 713/193; 713/200
(58) Field of Search .................. 380/3, 4, 5, 9, 380/10, 49, 50, 200–204, 210, 216, 217, 221, 222, 223, 226, 227, 228, 236, 239, 277, 278–282, 287; 713/182–186, 189, 193, 200–202

(56) References Cited

U.S. PATENT DOCUMENTS

| | | | |
|---|---|---|---|
| 4,405,829 A | | 9/1983 | Rivest et al. |
| 4,531,020 A | | 7/1985 | Wechselberger et al. |
| 4,613,901 A | | 9/1986 | Gilhousen et al. |
| 5,046,090 A | * | 9/1991 | Walker et al. .................. 380/5 |
| 5,224,166 A | * | 6/1993 | Hartman, Jr. ................. 380/50 |
| 5,392,351 A | * | 2/1995 | Hasebe et al. .................. 380/4 |
| 5,440,631 A | * | 8/1995 | Akiyama et al. ............... 380/4 |
| 5,442,706 A | * | 8/1995 | Kung .......................... 380/4 X |
| 5,555,304 A | * | 9/1996 | Hasebe et al. .................. 380/4 |
| 5,646,993 A | * | 7/1997 | Aizawa ......................... 380/4 |
| 5,651,064 A | * | 7/1997 | Newell .......................... 380/4 |

FOREIGN PATENT DOCUMENTS

EP 0 675 647 A1 10/1995

OTHER PUBLICATIONS

"Verification of Manually Installed Keys Via a Compute Verification Pattern Instruction Not Susceptible to a Chosen Plaintext Attack" IBM Technical Disclosure Bulletin, vol. 35, No. 2, Jul. 1, 1992, pp. 116–121, XP000313238.
Anonymous: "Mean to Protect System from Virus" IBM Technical Disclosure Bulletin, vol. 37, No. 8, Aug. 1994, pp. 659–660, XP000456561.
Anonymous: "Secure Loading of a Personal Computer Application"IBM Technical Disclosure Bulletin, vol. 39, No. 6, Jun. 1996, pp. 131–132, XP000678546.
Patent Abstracts of Japan, vol. 098, No. 007, Mar. 31, 1998 &JP 05 173891 A (Hewlett Packard Co & LT; HP & GT;), Jul. 13, 1993.

* cited by examiner

*Primary Examiner*—Bernarr E. Gregory
(74) *Attorney, Agent, or Firm*—Frommer Lawrence & Haug LLP; William S. Frommer; Gordon Kessler

(57) ABSTRACT

A signal reproducing apparatus in which unauthorized decoding or copying is rendered difficult. The apparatus is configured for reproducing ciphered data from a disc-shaped record medium 101 on which there are recorded data ciphered by at least one encryption operation and the key storage site information specifying the arraying site for at least one key information item used for deciphering the ciphered data. The apparatus includes a reproducing head device 12 for reading out the ciphered data and the key storage site information from the record medium 101, a TOC decoder 219, a CPU 224 and a digital signal processing circuit 220 for decoding the ciphered data using the key information stored on the site designated based on the key storage site information.

10 Claims, 29 Drawing Sheets

| SELECTION NUMBER | PRE-SET VALUE | SELECTION NUMBER | PRE-SET VALUE |
|---|---|---|---|
| 0 | $0001 | 8 | $4080 |
| 1 | $4000 | 9 | $2040 |
| 2 | $2000 | 10 | $1020 |
| 3 | $1000 | 11 | $0810 |
| 4 | $0800 | 12 | $0408 |
| 5 | $0400 | 13 | $0204 |
| 6 | $0200 | 14 | $0102 |
| 7 | $0100 | 15 | $4081 |

FIG.5

| POSITION | + 0 | + 1 | + 2 | + 3 | SIZE |
|---|---|---|---|---|---|
| 0 | \multicolumn{4}{c}{SYNCHRONIZATION} | 4 |
| 4 | \multicolumn{4}{c}{HEADER} | 16 |
| 20 | \multicolumn{4}{c}{USER DATA} | 2048 |
| 2068 | \multicolumn{4}{c}{ERROR CORRECTION CODE (EDC)} | 46 |

SIZE SUM : 2072 BYTES

| SYNC WORD | CODE WORD | | | |
|---|---|---|---|---|
| | SYNC PATTERN a | | SYNC PATTERN b | |
| | msb | lsb | msb | lsb |
| S0 | 0001001001000001 | 00000000001 | 1001001001000001 | 00000000001 |
| S1 | 0001000001000001 | 00000000001 | 1001000001000001 | 00000000001 |
| S2 | 0000001001000001 | 00000000001 | 1000001001000001 | 00000000001 |
| S3 | 0001000001000001 | 00000000001 | 1000100001000001 | 00000000001 |

FIG.13

| SELECTION NUMBER | PRE-SET VALUE | SELECTION NUMBER | PRE-SET VALUE |
|---|---|---|---|
| 0 | $0001 | 8 | $0010 |
| 1 | $5500 | 9 | $5000 |
| 2 | $0002 | 10 | $0020 |
| 3 | $2A00 | 11 | $2001 |
| 4 | $0004 | 12 | $0040 |
| 5 | $5400 | 13 | $4002 |
| 6 | $0008 | 14 | $0080 |
| 7 | $2800 | 15 | $0005 |

FIG.24

STATES 1 AND 2

|  | (MSB) | (LSB) | (MSB) | (LSB) |
|---|---|---|---|---|
| SY0 = | 0001001001000100 | 0000000000010001 | 0001001000000100 | 0000000000010001 |
| SY1 = | 0000010000000100 | 0000000000010001 | 0000010001001000 | 0000000000010001 |
| SY2 = | 0001000000000100 | 0000000000010001 | 0001000001000100 | 0000000000010001 |
| SY3 = | 0000010000000100 | 0000000000010001 | 0000010001001000 | 0000000000010001 |
| SY4 = | 0010001001000100 | 0000000000010001 | 0010000001000100 | 0000000000010001 |
| SY5 = | 0010010010001000 | 0000000000010001 | 0010001001000000 | 0000000000010001 |
| SY6 = | 0010010010001000 | 0000000000010001 | 0010000010001000 | 0000000000010001 |
| SY7 = | 0010010001001000 | 0000000000010001 | 0010010000000000 | 0000000000010001 |

FIG.30A

STATES 3 AND 4

|  | (MSB) | (LSB) | (MSB) | (LSB) |
|---|---|---|---|---|
| SY0 = | 1001001000000100 | 0000000000010001 | 1001001010000100 | 0000000000010001 |
| SY1 = | 1000010001001000 | 0000000000010001 | 1000010000000100 | 0000000000010001 |
| SY2 = | 1001000001000100 | 0000000000010001 | 1001000000000100 | 0000000000010001 |
| SY3 = | 1000010001001000 | 0000000000010001 | 1000010010000100 | 0000000000010001 |
| SY4 = | 1000100000001000 | 0000000000010001 | 1000100000000100 | 0000000000010001 |
| SY5 = | 1001001001000000 | 0000000000010001 | 1000100001000100 | 0000000000010001 |
| SY6 = | 1001000000001000 | 0000000000010001 | 1000000001001000 | 0000000000010001 |
| SY7 = | 1000100001000100 | 0000000000010001 | 1000010000010100 | 0000000000010001 |

FIG.30B

SIGNAL RECORDING APPARATUS, SIGNAL RECORD MEDIUM AND SIGNAL REPRODUCING APPARATUS

BACKGROUND OF THE INVENTION

1. Field of the Invention

This invention relates to a signal recording apparatus, a signal record(recording, recordable or recorded) medium and a signal reproducing apparatus for prohibiting copying or unauthorized use.

2. Description of the Related Art

Recently, with increased capacity and coming into widespread use of digital recording media, such as optical discs, prohibition of duplication or unauthorized use thereof has become incumbent for protecting the copyright of recorded signals. That is, digital audio data or digital video data can be duplicated by copying or dubbing without deterioration, while computer data can be duplicated to give data which are the same as the original data, so that troubles are caused due to unauthorized copying.

With this in view, a pre-set ID bit for preventing unauthorized copying is occasionally recorded on an original signal record medium for prohibiting unauthorized copying.

For example, in a system for prohibiting the unauthorized copying in a digital audio data recording/reproducing apparatus termed a rotary head digital audio tape recorder (R-DAT), an inhibiting code for inhibiting digital copying or generation-serial copying, that is for generation limitation (inhibiting code of a standard of the serial copying management system or SCMS) is recorded in a main data area for digital audio signals recorded on a digital audio tape as a signal record medium, so that, when the inhibiting code is detected by the digital audio signal recording apparatus, copy recording of the digital audio signals on a new digital audio tape is inhibited.

For preventing unauthorized copying of, for example, digital audio video signals recorded on a signal record medium, an ID bit for prevention of unauthorized copying (copy generation management system or CGMS) may be recorded on an original digital record medium, as in the case of the above-mentioned system for prevention of unauthorized copying between R-DAT recording/reproducing apparatus.

In the case of the computer data, it has been practiced to cipher the file contents themselves, using the encryption key information, and to permit it to be used only by the regular registered users. This system is related with a system in which digital recording media having recorded thereon the ciphered information are distributed as a form of information circulation and the user may acquire the key information on payment for the contents he or she requires in order to decipher and use the file contents.

However, the conventional inhibiting code or the encryption key information as described above is recorded in a particular location on the record medium which corresponds to the system and which is accessed by the user, as disclosed in JP Patent Publication Kokai JP-A-5-173891 (1993). Meanwhile, the inhibiting codes or the encryption key information is also usually ciphered.

If the inhibiting code or the encryption key information is fixedly arranged at an arbitrary position from one encryption technique to another, there is a risk of loss of interchangeability. In addition, if the inhibiting code or the encryption key information is fixedly arranged, the encryption technique is fixed and becomes poor in flexibility and extendibility, while the service life of the format itself tends to be diminished.

Also the encryption key information or the inhibiting code is located at a position accessible by the user, so that it may be decoded or illicitly copied by a knowledgeable user.

SUMMARY OF THE INVENTION

It is therefore an object of the present invention to overcome the above inconvenience and to provide a signal recording apparatus and a signal record(recording, recordable or recorded) medium in which a ciphered signal corresponding to a ciphered input signal and the key storage position information specifying the encryption key information arraying position are recorded on the signal record medium.

With the signal recording apparatus and the signal record medium of the present invention, a ciphered input signal and the key storage site information specifying the arraying site for the encryption key information are recorded on a signal record medium.

With the signal reproducing apparatus of the present invention, in reproducing signals from the signal record medium of the present invention, the ciphered signal and the key storage site information are read out from the signal record medium, and the ciphered signal is deciphered using the key information stored on the site designated by the key storage site information.

Thus, by recording the key storage site information on the signal record medium for specifying the site of the key information, and taking out the key information for signal reproduction based on the key storage site information on the occasion of signal reproduction, the key information can be taken out only with considerable difficulties.

According to the present invention, since the key storage site information specifying the site of the key information is recorded on the signal record medium, and the key information is taken out on the basis of the key storage site information on the occasion of signal reproduction, it becomes possible to prohibit the unauthorized decoding or copying.

BRIEF DESCRIPTION OF THE DRAWINGS

FIG. 5 illustrates scrambler pre-set values.

FIG. 13 illustrates an example of a synchronization word appended to a modulated signal.

FIG. 24 illustrates an example of pre-set values of the scrambler shown in FIG. 21.

FIGS. 30A, 30B illustrates other examples of the synchronization word appended to the modulated signal.

DESCRIPTION OF THE PREFERRED EMBODIMENTS

Figure 1:
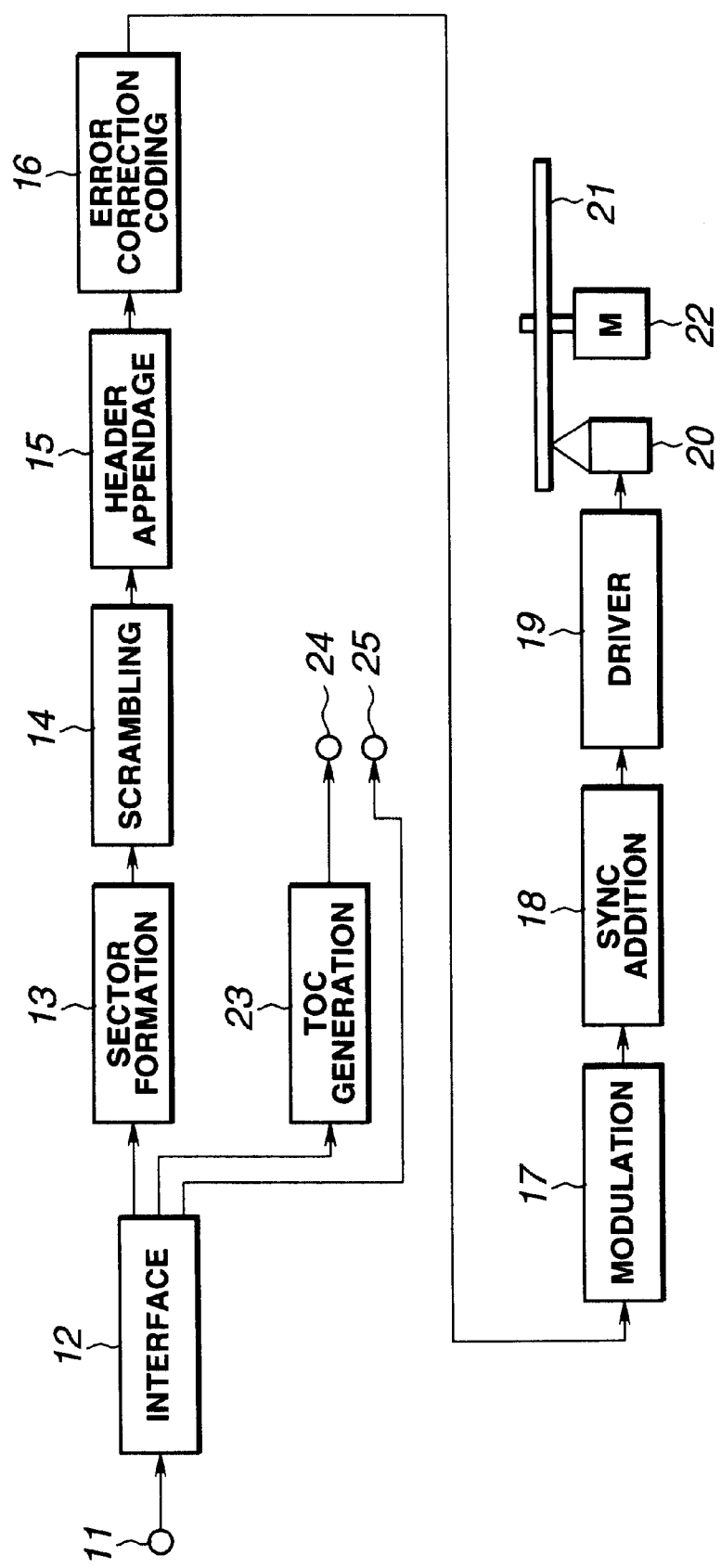
FIG. 1 is a block circuit diagram showing an embodiment of a signal recording apparatus according to the present invention.

Referring to the drawings, preferred embodiments of the present invention will be explained in detail.

FIG. 1 shows, in a schematic block diagram, an embodiment of a signal recording apparatus embodying the present invention.

Referring to FIG. 1, digital data, such as data converted from analog audio signals or video signals by A/D conversion, or computer data, are supplied to an input terminal 11. The input digital data is sent via an interfacing circuit 12 to a sector forming circuit 13 so as to be formed into sectors each made up of 2048 bytes as a unit.

The data formed into sectors are sent to a scrambling circuit 14 for scrambling. The scrambling herein means randomization of input data for preventing the same byte pattern from appearing continuously, that is for removing the same, pattern, for enabling proper signal reading and writing.

The scrambled or randomized data is sent to a header appendage circuit 15 where header data is appended to a leading end of each sector. The resulting data is sent to an error correction encoding circuit 16.

The error correction appendage circuit 16 performs data delaying and parity calculations by adding of parity data.

A modulation circuit 17 of the next stage converts 8-bit data, for example, into 16 channel bit modulated data in accordance with a pre-set modulation rule and sends the resulting modulated data to a synchronization appendage circuit 18. The synchronization appendage circuit 18 appends synchronization signals of a so-called out-of-rule pattern in terms of a pre-set data volume as a unit and sends the resulting data via a driving circuit, that is a driver 19, to a recording head 20.

The recording head 20 effects optical or photo-magnetic recording and records the modulated recording signals on a discshaped record(recording recordable or recorded) medium 21. This disc-shaped record medium 21 is rotated by a spindle motor 22.

The scrambling circuit 14 is not essential and may also be inserted downstream of the header appendage circuit 15 for scrambling the digital data with the header appended thereto and for sending the scrambled data to the error correction coding circuit 16.

At least one of the sector formation circuit 13, scrambling circuit 14, header appendage circuit 15, error correction encoding circuit 16, modulation circuit 17 and the synchronization appendage circuit 18 is configured for ciphering the input signal and outputting the resulting ciphered signal. Preferably, such encryption is performed in two or more circuits.

The key information for encryption may use, at least in a portion thereof, the identification information, such as the production number proper to a particular record medium, producer identification number, seller identification number, identification information proper to a particular recording apparatus or a particular encoder, or the identification information proper to a particular device for producing the recording media, such as a cutting machine or a stamper, or the identification information supplied from outside. The input data is ciphered in at least one and desirably in two or more of the circuits 13 to 18, using the key information.

Which of the circuits 13 to 18 has done the encryption also represents one of alternatives and is thought to be the key required for producing the regular reproduction signal during reproduction. That is, if encryption is done in one of the circuits, it becomes necessary to select one of six alternatives, whereas, if encryption is done in two of the six circuits, it becomes necessary to select one of thirty alternatives. If there is a possibility of performing the encryption at one to six of the six circuits 13 to 18, the number of alternatives is increased further, such that it becomes difficult to find the combinations by a trial-and error method. Thus the purpose of encryption can be met satisfactorily.

The key information for encryption may also be switched at a pre-set timing, for example, at a sector period. If the key information is switched at this pre-set timing, the information as to whether or not switching is performed, switching period or the switching sequence of plural items of the key information, may also be used as the key for further raising the level of encryption and ciphering or deciphering difficulties.

The above key information is stored in a location on the record medium as specified by the encryption key storage site information as later explained by using the recording head 20. Also, in another embodiment, the above key information is written in a location on the record medium by using bar codes', wobbling or ultraviolet rays. Further, in another embodiment, the above key information is stored in a location other than positions on the record medium 101 and key information is provided to the reproducing apparatus as later explained. The key storage site information is the information transmitted from, for example, the interfacing circuit 12 via a table-of-contents (TOC) generating circuit 23 to a terminal 24, or the information directly sent from the interfacing circuit 12 to the terminal 25. These items of the key storage site information are recorded in a TOC area or other pre-set sites of the record medium 101 by using the recording head 20. In the following explanation, the key storage site information is recorded in the TOC area.

The structure of the circuits 13 to 18 and illustrative examples of the ciphering operations are now explained.

Figure 2:
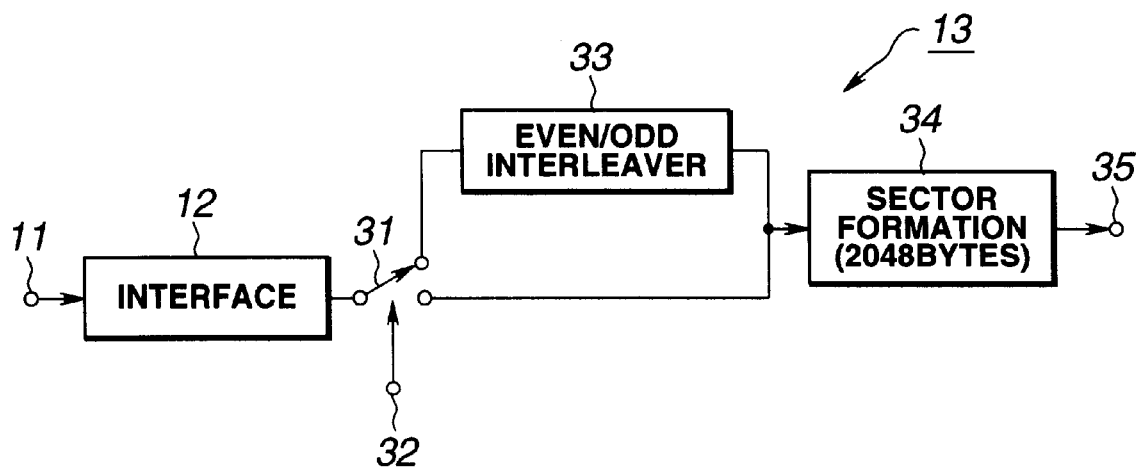
FIG. 2 is a block diagram showing an embodiment for realization of even and odd byte interleaving in a sector forming circuit.

First, even byte/odd byte interleaving may be carried out in the sector forming circuit 13, as shown in FIG. 2. That is, in FIG. 2, an output of the interfacing circuit 12 of FIG. 2 is sent to a two-output changeover switch 31, an output of which is sent via an even/odd interleaver 33 to a sector forming circuit 34 and the other output of which is directly sent to a sector forming circuit 34. The sector forming circuit 34 groups 2048 bytes, for example, of the input data in one sector. The switching of the changeover switch 32 of the sector formation circuit 13 is controlled by the one-bit control signal operating as a key for switching. The even/odd interleaver 33 distributes one-sector input data, in which even-numbered bytes 36a and odd-numbered bytes 36b are arranged as shown in FIG. 3A, in an even data portion 37a and in an odd data portion 37b, as shown in FIG. 3B, and outputs the resulting data. It is also possible to designate only a pre-set area 39 in a sector by the key information and to distribute only data in this area 39 in an even data portion 39a and in an odd data portion 39b. In the latter case, plural areas such as the area 39 may be selectively set for further increasing the alternatives of the key information for further raising the level of encryption.

Figure 4:
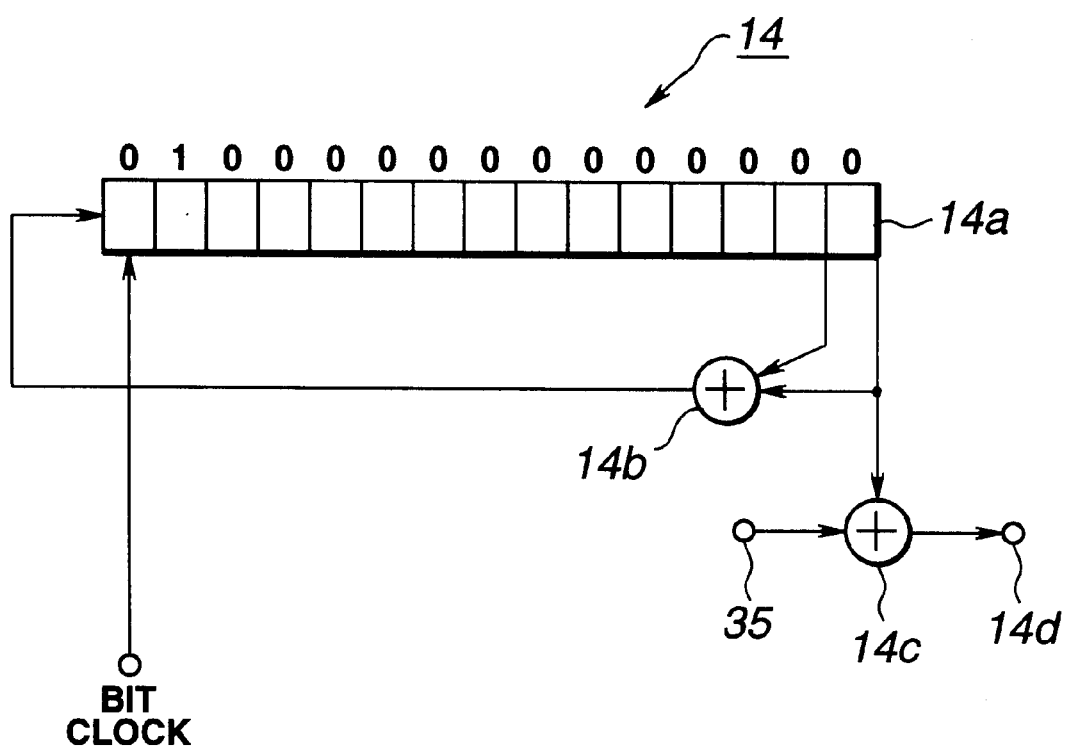
FIG. 4 is a circuit diagram showing a scrambler.

As the scrambling circuit 14, a so-called parallel block synchronization type scrambler employing a 15-bit shift register may be employed, as shown for example in FIG. 4. To a data input terminal 35 of the scrambler is entered data from the sector forming circuit 13 in an LSB first sequence, that is in a sequence in which the least significant bit is entered temporally first. The scrambling circuit 14 includes a 15-bit shift register 14a for scrambling for which feedback is applied in accordance with a generating polynomial $x^{15}+x+1$, using an exclusive OR (ExOR) circuit 14b. Pre-set values or initial values as shown in FIG. 5 are set in the 15-bit shift register 14a. The selection numbers for the pre-set values of FIG. 5 are associated with, for example, the lower four bits of the sector addresses, so that the pre-set values will be switched on the sector basis. Output data of the shift register 14a and input data from a terminal 35 are ExORed by the ExOR circuit 14c, an output of which is sent via a terminal 14d to the header appendage circuit 15 of FIG. 1.

Figure 6:
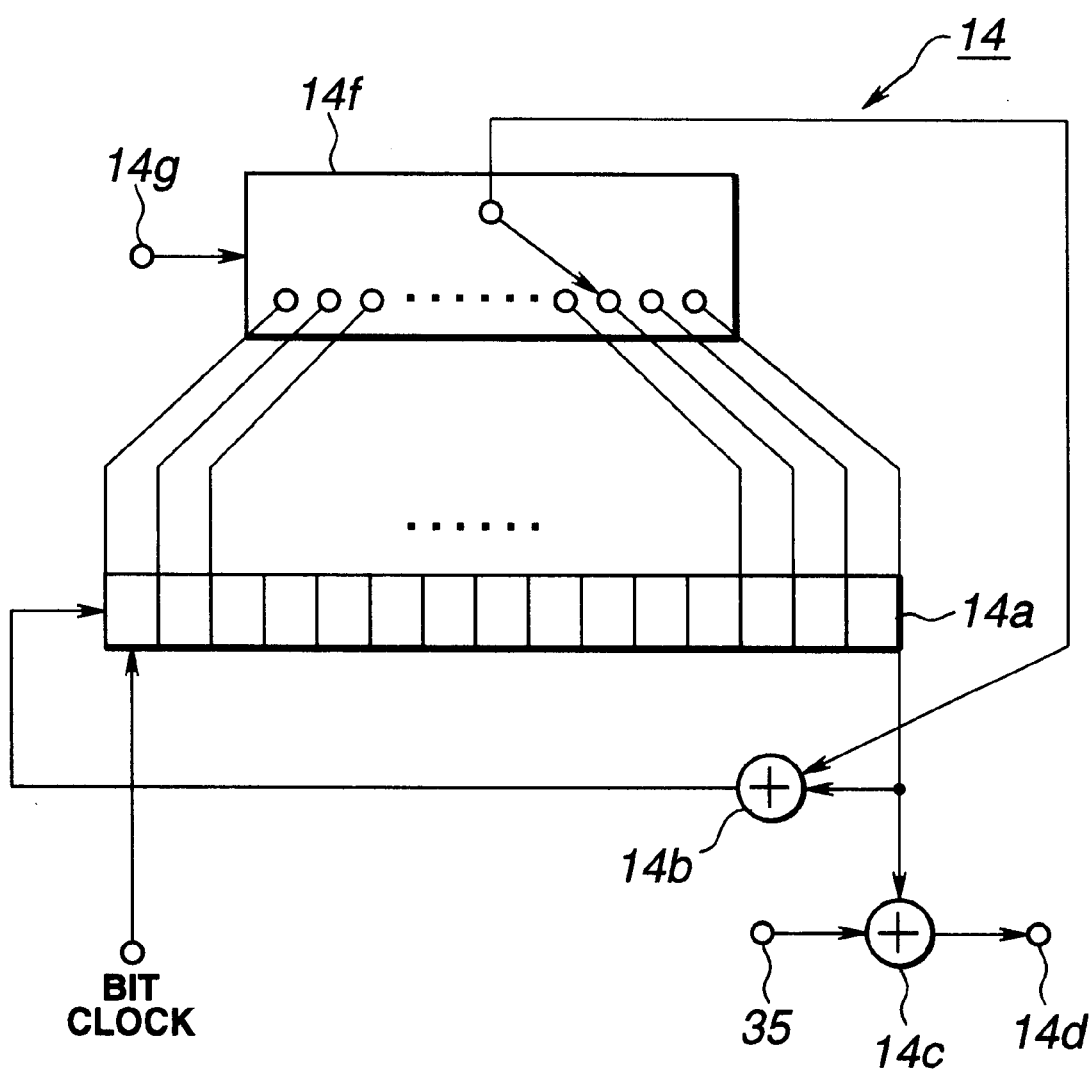
FIG. 6 illustrates a scrambler with variable generating polynomials.

The generating polynomial and the pre-set values (initial values) may be varied depending on the key information, such as the pre-set identification numbers. The generating polynomial may be varied by an arrangement shown in FIG. 6, in which bit outputs of the 15-bit shift register 14a are sent to respective selection terminals of the changeover switch 14f controlled in turn by, for example, 4-bit control data from a control terminal 14g. An output of the changeover switch 14f is sent to the ExOR circuit 14b. The value of n of the generating polynomial $x^{15}+x^{n}+1$ may be changed by changing the value of the control data of the control terminal 14g. For varying the pre-set values, logical operations may be executed between respective pre-set values of the table shown in FIG. 5 with respective byte values of, for example, 16-byte identification information. The identification information may include the identification information proper to the record medium, the producer identification information, seller identification information, the identification information proper to the recording apparatus or the encoder, or the identification information supplied from outside, alone or in combination. These information items may also be used in combination with other information items. The logical operations may be enumerated by ExOR, AND, OR and bit shifting. The configuration for varying the generating polynomial is not limited to the configuration of FIG. 6. For example, the number of stages or taps of the shift register may be changed in any desired manner.

The header appendage circuit 15 is now explained.

Figures 7, 8:
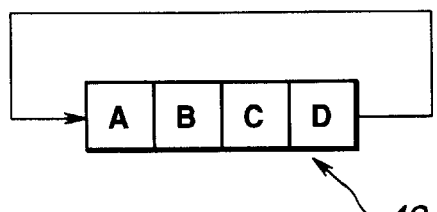
FIG. 7 shows an example of a sector format.
FIG. 8 illustrates an example of encryption in a synchronization area in a sector.

An illustrative example of the sector format is shown in FIG. 7, in which a sector is made up of a 2048 byte user data area 41 to which are appended a 4-byte synchronization area 42, a 16-byte header area 43 and a 4-byte error detection code (EDC) area 44. The error detection code of the error detection code area 44 is made up of 32-bit CRC code generated for the user data area 41 and the header area 43. Encryption in the header appendage circuit 15 may include that for the synchronization data, that is data sync, header address and for CRC.

As an example of encryption for the data synchronization or data sync, if the byte patterns allocated to respective bytes of the 4-byte synchronization area 42 are represented by A, B, C and D in FIG. 8, the 4-byte contents may be shifted or rotated using the 2-bit key information. Specifically, by switching to "ABCD", "BCDA", "CDAB" or to "DABC" for the 2-bit key of "0", "1", "2" or "3", sector synchronization cannot be engaged if there is no key registration, such that regular reproduction cannot be realized. As the byte patterns A to D, character codes of, for example, ISO646 may, for example, be employed.

Figure 9:
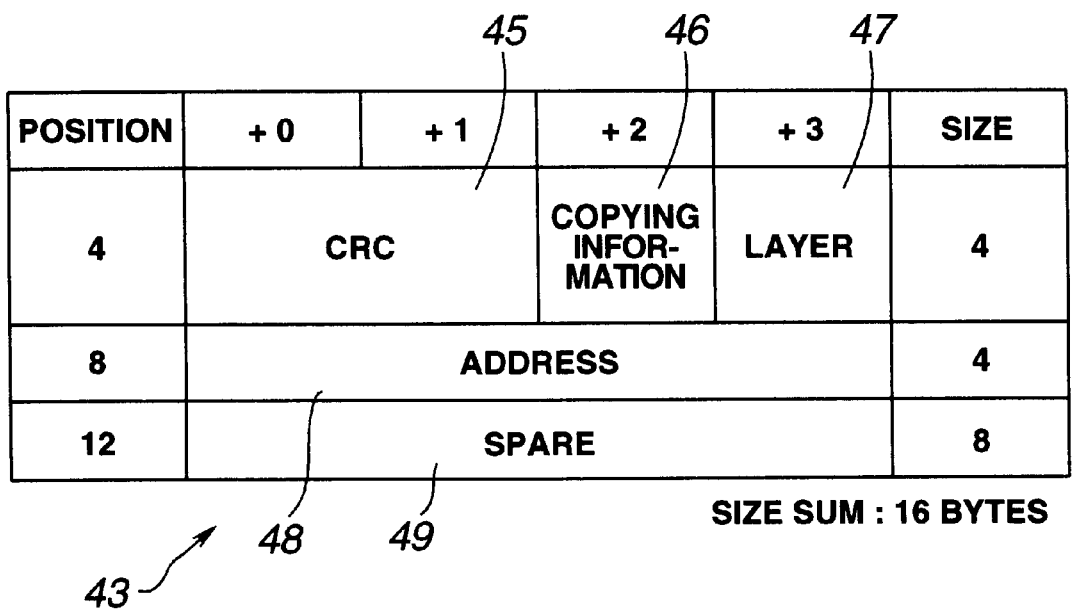
FIG. 9 illustrates an example of a header area in a sector.

In the header area 43, there are areas such as an area of CRC 45, which is a so-called cyclic code, an area for copying information 46, such as copy permit/not permit or copying generation management, a layer 47 specifying one of multiple layers of a multi-layer disc, an address area 48 and a spare area 49, as shown in FIG. 9. Of these, the address area 48 may be bit-scrambled, in which case encryption may be performed by bit-based transposition. If, in the generating polynomial for CRC 45, $x^{18}+x^{15}+x^{2}+1$ is used, 15 bits corresponding to $x^{15}$ to x may be changed in place of the second and third terms $x^{15}$ and x responsive to the key. Alternatively, logical operations may be executed on the 16 bits of the CRC 45 and the key information.

For the key information, the identification information proper to the record medium, the producer identification information, seller identification information, the identification information proper to the recording apparatus or encoder, or the identification information supplied from outside, may be used alone or in combination. These information items may also be used in combination with other information items.

Figure 10:
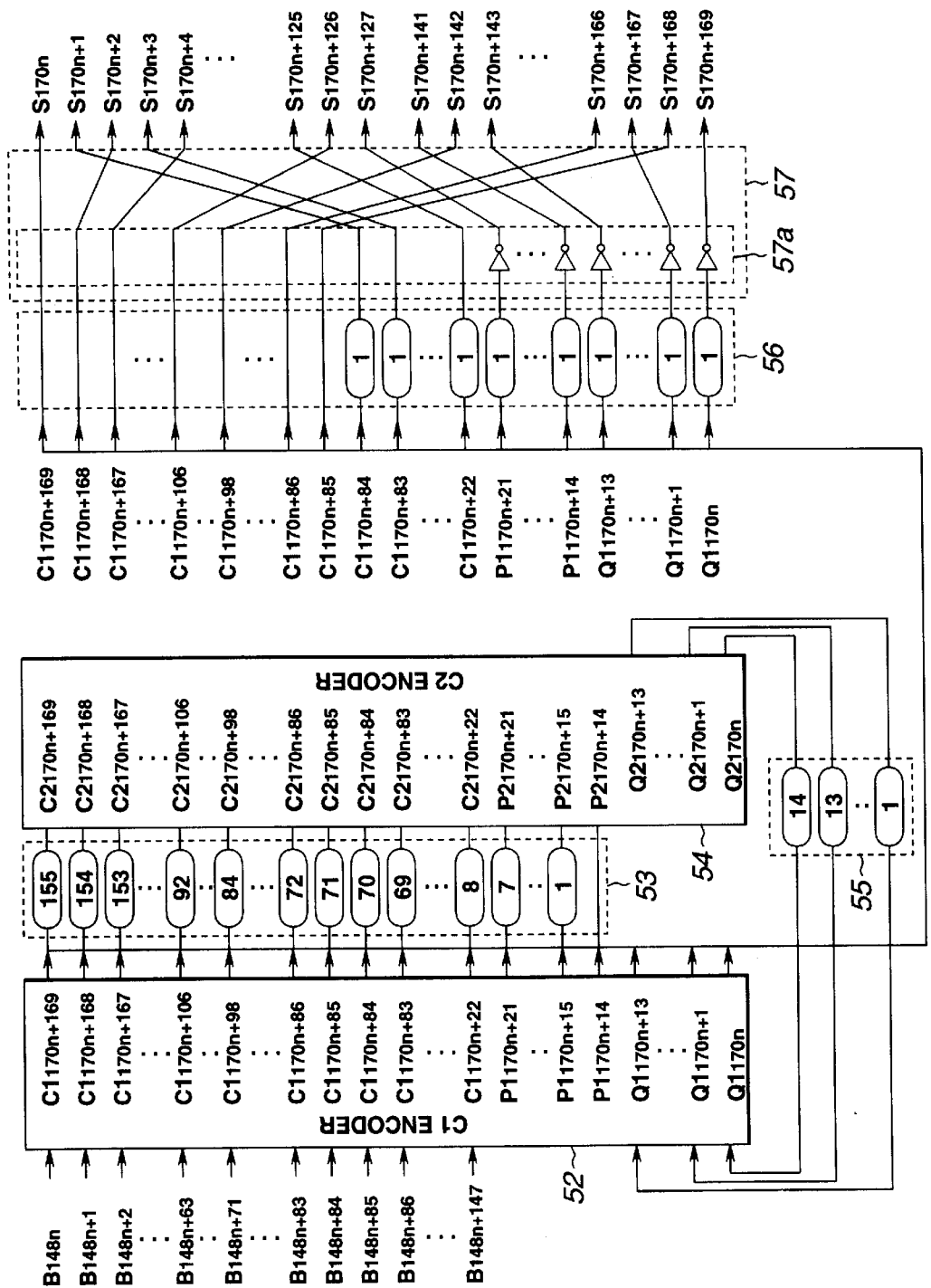
FIG. 10 illustrates an example of an error correction encoding circuit.

Referring to FIG. 10, an illustrative structure of the error correction encoding circuit 16 is explained.

Referring to FIG. 10, each frame for error correction coding is made up of 148 bytes or 148 symbols. The digital data from the header appendage circuit 15 is grouped in terms of 148 bytes as a unit and sent to a C1 encoder 52 as a first encoder. The C1 encoder 52 appends 8-byte P-parity and the resulting data is supplied via a delay circuit 53 for interleaving to a C2 encoder 54 as a second encoder. The C2 encoder 54 appends 14-byte Q-parity which is returned to the C1 encoder 52 via a delay circuit 55. From the C1 encoder 52, 170-byte data inclusive of the P-parity and the Q-parity is outputted and supplied via a re-arraying circuit 57 having inverters 57a to the modulation circuit 17 of FIG. 1.

For encryption in the error correction coding circuit as described above, selection as to whether an inverter should be inserted responsive to the key information for encryption may be made for each byte in the inverters 57a of the re-arraying circuit 57. That is, in the basic arrangement, 22 bytes of the P parity and Q parity are inverted by the inverters of the re-arraying circuit 57, however, some of these inverters may be removed or several inverters may be inserted on the C1 data side before outputting the data.

In carrying out such data conversion, the probability of error correction is changed depending on the degree of difference from the reference structure, such that, if the difference is small, the probability of error occurrence is only slightly higher, whereas, if the difference is large, the error correction is decreased on the whole such that reproduction becomes almost infeasible. As for the C1 encoder, the distance as an index of the error correction ability is 9, so that error detection and correction is feasible up to the maximum of 4 bytes, and should there be an erasure point, error detection and correction is feasible up to the maximum of eight bytes. Therefore, if there are five or more distances, error correction always becomes infeasible or results in mistaken correction with the C1 code. If there are four distances, a delicate situation arises that correction becomes impossible if there occurs even another one-byte error. As the difference is decreased from three through two to one, the probability of error correction is increased. If this is used, the playback state in which reproduction is possible to a certain extent but is not impeccable and occasionally disturbed, may be positively created when furnishing the audio or video software. This playback state can be used for apprising the user of the outline of the software.

In this case, there is a method in which two inverter change positions, for example, are prescribed, a method in which the change points are selected at random responsive to the key information and the minimum number is limited to two and a method consisting in the combination of these two methods.

The inverter insertion position or the inverter changing position is not limited to that of the re-arraying circuit 57 in FIG. 10. For example, the inverter insertion position or the inverter changing position may be upstream and/or downstream of the C1 encoder 52. If there are plural positions, different keys may also be used. Bit addition or a variety of logical operations may also be used in place of using the inverters. A variety of ciphering techniques, such as conversion by shift registers or various function operations may also be applied alone or in combination.

Figure 11:
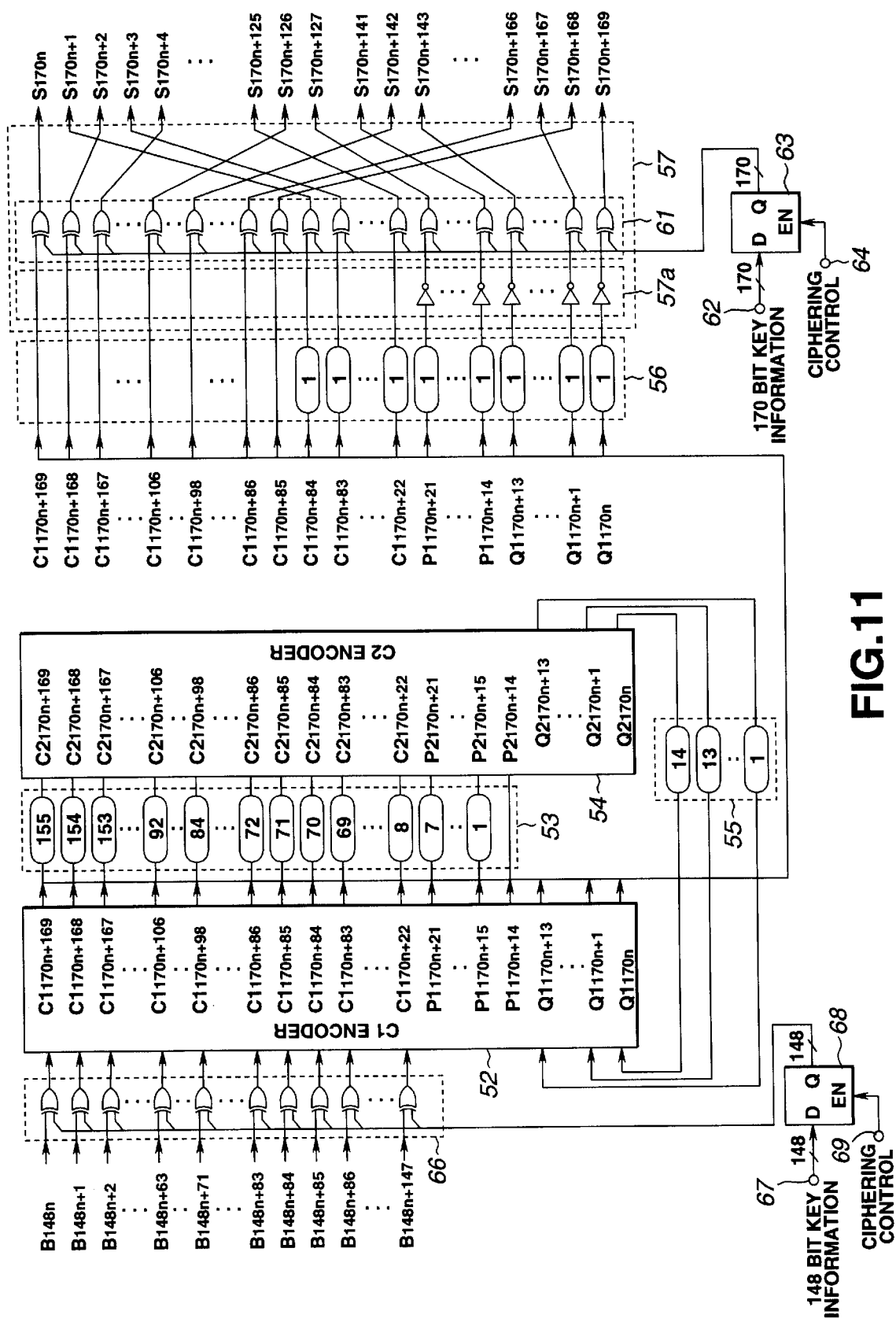
FIG. 11 illustrates another example of an error correction encoding circuit.

FIG. 11 shows another illustrative example of the error correction encoding circuit 16 in which a set of exclusive-OR (ExOR) gates 61 are inserted downstream of the inverters 57a in the re-arraying circuit 57 while another set of exclusive-OR (Ex-OR) gates 66 are inserted upstream of the C1 encoder 52.

Specifically, the ExOR gates 62 perform data conversion by ExOR on 170 byte data taken out from the C1 encoder 52 via the delay circuit 56 and the inverter 57a of the re-arraying circuit 57, that is information data $C1_{170n+189}$ to $C1_{170n+22}$ and parity data $P1_{170n+21}$ to $P1_{170n+14}$ and $Q1_{170n+13}$ to $Q1_{170n}$, while the ExOR gates 66 perform data conversion by ExOR on 148 byte input data $B_{148n}$ to $B_{148n+147}$ by ExOR conversion. The ExOR gates used in these sets of the ExOR gates 61, 66 are 8-bit ExOR gates for ExORing one-byte or 8-bit input data and pre-set 8-bit data specified by one-bit control data. 170 and 148 of such ExOR gates are used in the set of the Ex-OR gates 61 and the set of the Ex-OR gates 66, respectively. If the pre-set 8-bit data are all 1, the Ex-OR gates correspond to inverter circuits.

In FIG. 11, 170 bits of the key information are supplied to a terminal 62, so as to be supplied by a D-latch circuit 63 to each of 170 ExOR gates within the set of EXOR gates 61. The D-latch circuit 63 is responsive to the 1-bit ciphering control signal supplied to an enabling terminal 64 for switching between sending the 170-bit key information from the terminal 62 directly to the set of ExOR gates 61 and setting all of the 170 bits to zero. The ExOR gates of the 170 ExOR gates of the set of ExOR gates 61 supplied with "0"s from the D-latch gate 63 directly output the data from the inverters 57a in the re-arraying circuit 57, while the ExOR gates of the set of ExOR gates 61 supplied with "1"s from the D-latch gate 63 invert the data from the inverters 57a in the re-arraying circuit 57 and output the inverted data. In case of all-zeros, data from the inverters 57a in the re-arraying circuit 57 are outputted directly. The set of ExOR gates 66 is similar to the set of ExOR gates 61 except for having 149 ExOR gates and 148 bits of the key information. Thus the 148-bit key information supplied to a terminal 67 is sent via a D-latch circuit 68 to 148 ExOR gates in the set of ExOR gates 66, while the D-latch circuit 68 is switched by an encryption control signal at an enabling terminal 69 between the 148-bit key information and all zeros.

In the embodiment of FIG. 11, the set of ExOR gates 61 performs data conversion by ExOR on information data $C1_{170n+189}$ to $C1_{170n+22}$ and parity data $P1_{170n+21}$ to $P1_{170n+14}$ and $Q1_{170n+13}$ to $Q1_{170n}$, as 170-byte data taken out from the C1 encoder 52 via the delay circuit 56 and inverters 57a. It is however possible that data conversion on the parity data be not performed and that data conversion responsive to the 148-bit key information be performed on the remaining 148 byte information data $C1_{170n+169}$ to $C1_{170n+22}$.

Of course, the operation and effect similar to the circuit of FIG. 10 may be realized. Alternatively, only one of the sets of ExOR gates 61, 66 may be used, or the selection of one or both of the ExOR gates 61, 66 may be used as the key for encryption.

For the key information, the identification information proper to the record medium, the producer identification information, seller identification information, the identification information proper to the recording apparatus or the encoder, or the identification information supplied from outside, may be used alone or in combination, while these information items may also be used in combination with other information items, as discussed above.

It is also possible to use AND, OR, NAND, NOR or inverter circuits in place of the sets of the ExOR gates as data conversion means. Also, logical operations may also be performed on the 8-bit information data, using the 8-bit key data, in place of performing logical operations on the 8-bit basis using the 1-bit key information or key data. Alternatively, the AND, OR, ExOR, NAND, NOR or inverter circuits may be used in combination with respective eight bits corresponding to one word of information data. In such case, 148 8 bit key data is used for 148 byte or 148 8 bit data. If the AND, OR, ExOR, NAND, NOR or inverter circuits are used in combination, the combination itself may be used as the key for encryption. In addition to logical operations, the transposition of changing the data values or data value substitution may also be used as the data conversion. Also, a variety of encryption techniques, such as conversion by a shift register or by a variety of function operations, may be applied alone or in combination.

Figure 12:
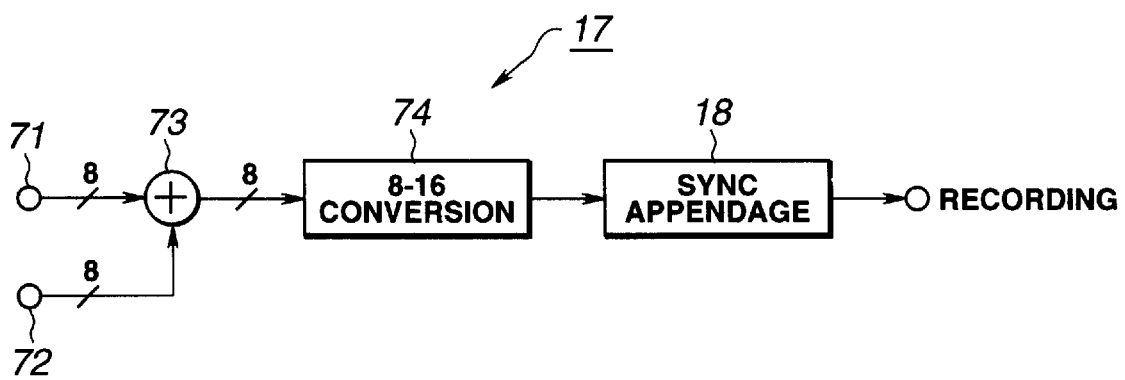
FIG. 12 illustrates an example of encryption performed by a modulation circuit.

Referring to FIG. 12, the ciphering operation by the modulation circuit 17 of FIG. 1 is explained. In FIG. 12, 8-bit or 1-byte based data from the error correction encoding circuit 16 is supplied to an input terminal 71, while an 8-bit based key data is supplied to an input terminal 72. These two types of the 8-bit data are sent to an ExOR gate 73, as an example of the logical circuit 73, for ExOR operation. An 8-bit output of the ExOR gate 73 is sent to a modulator of a pre-set modulation system, for example, an 8–16 conversion circuit 74, for conversion to 16 channel-bit data. An example of the 8–16 conversion circuit 74 is a so-called EFM plus modulation system.

Although the encryption by the 8-bit key information is performed before data modulation in the embodiment of FIG. 12, the number of bits of the key information is not limited to 8 bits. Also, the input/output correspondence of the conversion table for 8–16 conversion may be changed depending on the key information. Of course, the identification information proper to the medium may be used as the key information.

The synchronization appendage circuit 18 is now explained.

The synchronization appendage circuit 18 uses four types of the synchronization words S0 to S3 shown for example in FIG. 13 for synchronization based on a frame of 8–16 modulation as a unit. The 8–16 modulation frame, such as the EFM plus frame, is made up of, for example, 1360 channel bits, which are 85 data symbols. 32 channel-bit synchronization words are appended every one frame or 1360 channel bits. The frame is associated with the C1 code and the C2 code for structuring. On the other hand, the synchronization word of the leading frame of the C1 code series is made to differ from the synchronization word of other frames for differently using the four types of the synchronization words S0 to S3. These synchronization words S0 to S3 have respective two synchronization patterns a, b depending on the states of "0" or "1" of the directly previous word, digital sum values or dc values.

Figure 14:
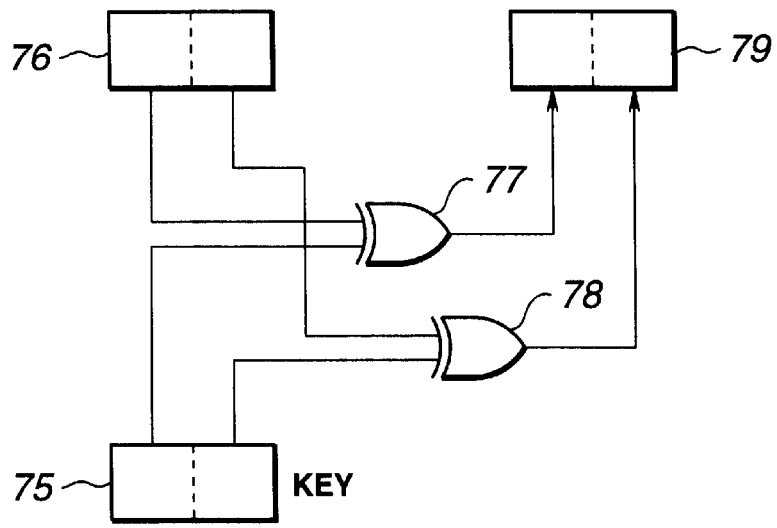
FIG. 14 illustrates an example of encryption by a synchronization appendage circuit.

The selection of these four types of the synchronization words S0 to S3 is changed responsive to the 2-bit key information 75 for encryption, using a circuit shown for example in FIG. 14. That is, respective bits of the 2-bit data 76 designating the four types of the synchronization words S0 to S3 and respective bits of the 2-bit key information 75 are ExORed by two EXOR gates 77, 78 to a new synchronization word designation data 79. This modifies the manner of using the synchronization word in the above frame structure for performing the encryption.

Meanwhile, the number of the types of the synchronization words may be increased further and the manner of taking out the four types of the synchronization words from among these increased types of the synchronization words may be determined by the key for encryption. As such key information, the identification information proper to the medium may be used.

Figure 15:
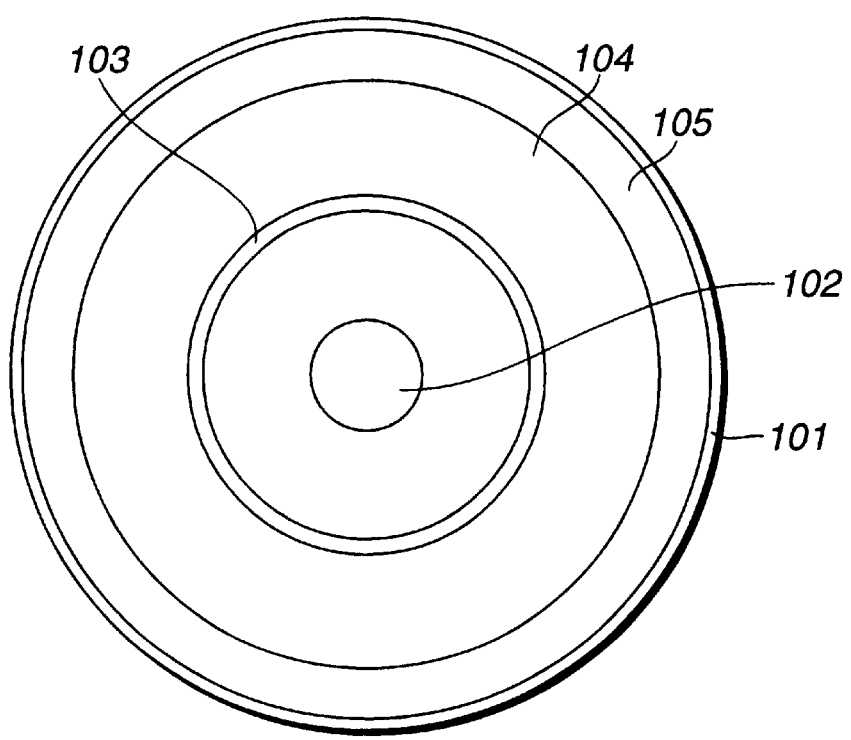
FIG. 15 illustrates a data record medium.

FIG. 15 shows a disc-shaped record medium 101, such as an optical disc, as an example of a record medium. The disc-shaped record medium 101 has a center aperture 102. Looking from the inner rim towards the outer rim of the disc-shaped record medium 101, there are formed a lead-in area 103, as a program management region or TOC region, a program area 104 having program data recorded therein, and a program end area, or a so-called lead-out area 105. In an optical disc for reproducing audio or video signals, the audio or video signals are recorded in the program area 104, while the time information or the like for the audio or video data is managed by the lead-in area 103.

In the record medium 101, the key storage site information is recorded in the lead-in area 103 as part of the TOC information. For reproduction, the key storage site information is read out, and the key information for encryption is taken out based on the read out key storage site information.

The storage site for the key information, specified by the key storage site information, will be explained subsequently.

Figure 16:
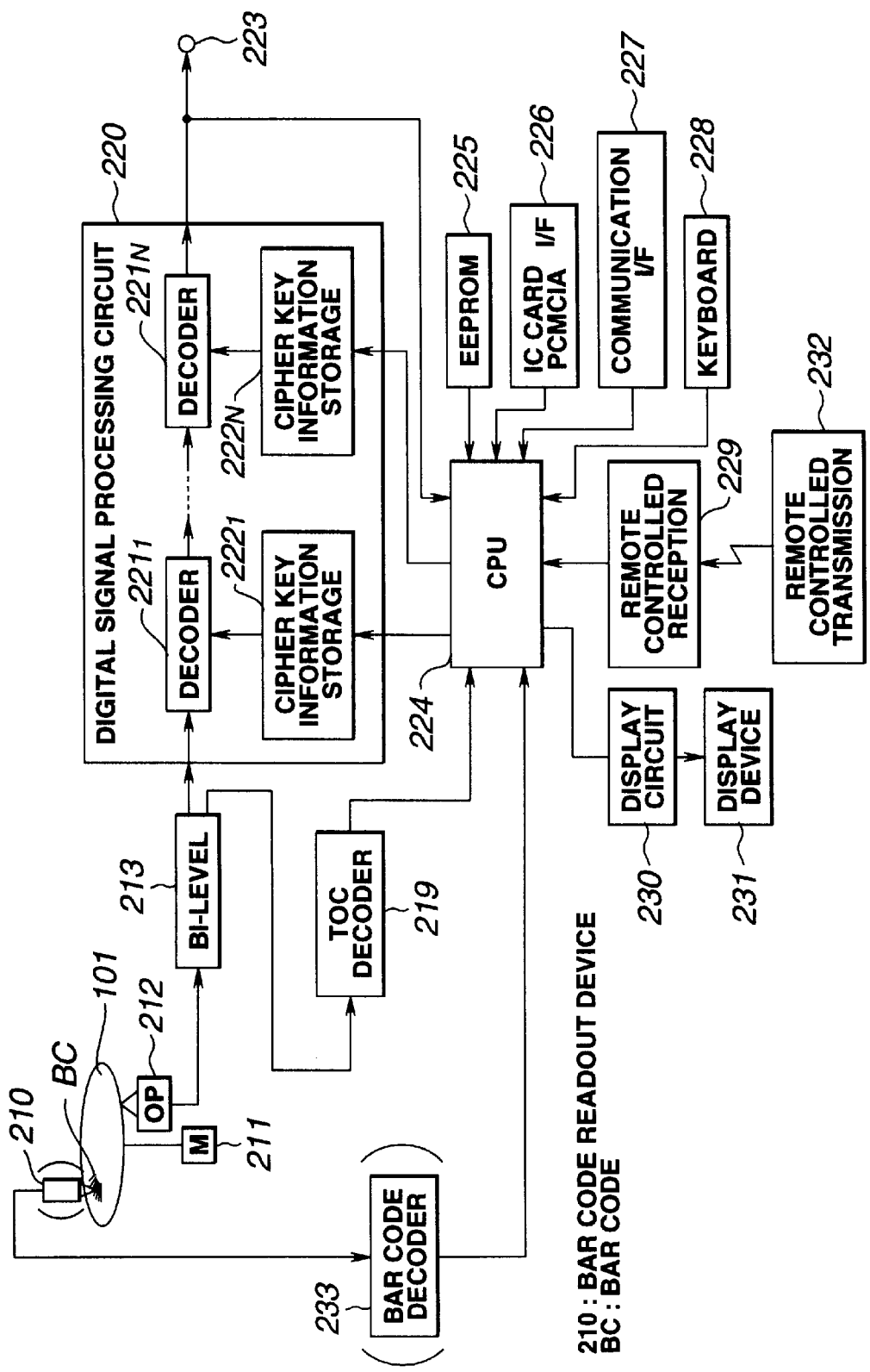
FIG. 16 is a block circuit diagram showing an embodiment of a signal reproducing apparatus according to the present invention.

The reproducing apparatus for reproducing data from the disc-shaped record medium 101 is explained by referring to FIG. 16.

In FIG. 16, a disc-shaped record medium 101, as a record medium, is rotated by a spindle motor 211, so as to have its recording contents read out by a reproducing head device 212, such as an optical pickup.

The signals read out by the reproducing head 212 are converted by a bi-level forming circuit 213 into bi-level digital data which is sent to a digital signal processing circuit 220. Of the digital data, converted by the bi-level forming circuit 213 into bi-level data, data read out from the TOC area is sent to a TOC decoder 219 for decoding. The resulting decoded data is sent to a CPU 224.

The CPU 224 takes out the key storage site information from data from the TOC decoder 219. The CPU 224 takes out the key information, based on the key storage site information, as later explained, and stores the key information in plural encryption key information accumulation circuits $222_1$ to $222_N$.

The digital signal processing circuit 220 has plural decoders $221_1$ to $221_N$ and plural encryption key information accumulation circuits $222_1$ to $222_N$. The decoders $221_1$ to $221_N$ perform an operation which is the reverse of the operation by the structure from the sector forming circuit 13 to the synchronization appendage circuit 18 shown in FIG. 1. That is, if the encryption employing the key information is performed in at least one and preferably two or more of these circuits 13 to 18, the digital signal processing circuit 220 deciphers in the decoders associated with the circuits among the circuits 13 to 18 involved in ciphering, using the key information accumulated in the encryption key information accumulation circuits $222_1$ to $222_N$.

Figure 17:
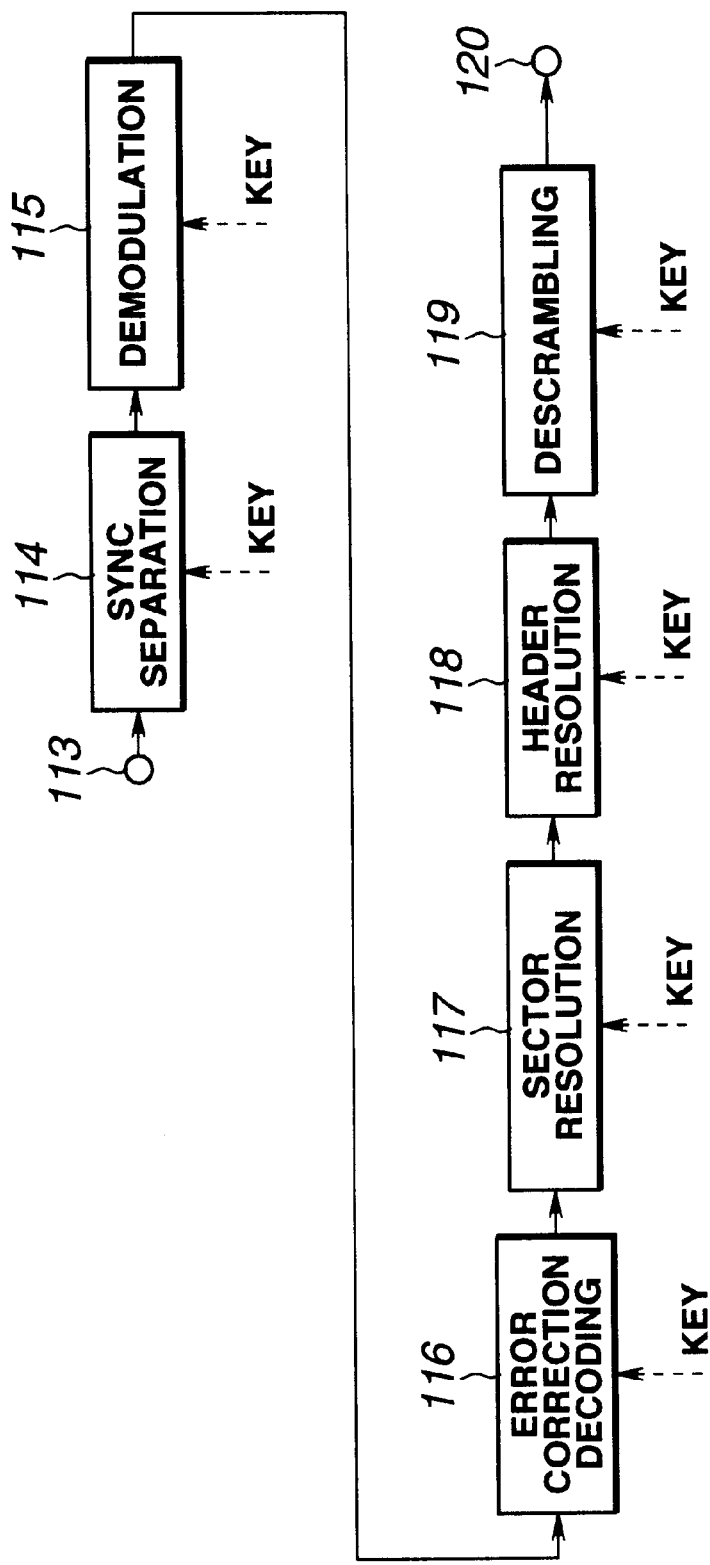
FIG. 17 is a block circuit diagram showing an embodiment of a digital signal processing circuit of the signal reproducing apparatus shown in FIG. 16.

Specifically, the digital signal processing circuit 220 has a structure shown in FIG. 17 in association with the decoders $221_1$ to $221_N$. Output data of the bi-level forming circuit 213 is supplied to a terminal 113 of FIG. 17, in which a synchronization separation circuit 114 separates the synchronization signal appended in the synchronization appendage circuit 18 shown in FIG. 1. The digital signal from the synchronization separation circuit 114 is sent to a demodulation circuit 114 for separation of the synchronization signal appended by the synchronization appendage circuit 18 of FIG. 1. The digital signal from the synchronization separation circuit 114 is sent to a demodulation circuit 115 for effectuating demodulation which is the reverse operation of the modulation performed by the modulation circuit 17 of FIG. 1. Specifically, the demodulation is an operation of converting the 16 channel bits into 8 bit data. The digital data from the demodulation circuit 115 is sent to an error correction decoding circuit 116 for performing a decoding operation which is the reverse operation of encoding by the error correction encoding circuit 16 of FIG. 1. The decoded data is resolved into sectors by a sector resolution circuit 117 and the header at the leading end of each sector is separated by a header separation circuit 118. The sector resolution circuit 117 and the header separation circuit 118 are counterpart devices of the sector forming circuit 13 and the header appendage circuit 15 of FIG. 1, respectively. The resulting data is descrambled by a descrambling circuit 119. The descrambling is an operation which is the reverse of the scrambling performed by the scrambling circuit 14 of FIG. 1. The resulting output data is outputted at a terminal 120 and then supplied to an output terminal 223 of FIG. 16.

If the encryption is done during recording by the sector forming circuit 13 of FIG. 1, the sector resolution circuit 117 performs the deciphering using the key information for encryption. Similarly, the deciphering by the descrambling circuit 119 is performed in association with the encryption performed by the scrambling circuit 14 of FIG. 1, while the deciphering by the header separation circuit 118 is performed in association with the ciphering performed by the header appendage circuit 15 of FIG. 1. The deciphering by the error correction decoding circuit 116 is performed in association with the ciphering performed by the error correction encoding circuit 16 of FIG. 1, while the deciphering by the demodulation circuit 115 is performed in association with the ciphering performed by the modulation circuit 17 of FIG. 1. Finally, the deciphering by the synchronization separation circuit 114 is performed in association with the ciphering performed by the synchronization appendage circuit 18 of FIG. 1.

The CPU 224 of the present invention finds the location where the key information is actually stored, based on the key information storage site information supplied from the TOC decoder 219, and takes out the key information stored in a site corresponding to the key storage site information. The CPU 224 causes the key information thus taken out to be accumulated in the encryption key information accumulation circuits $222_1$ to $222_N$, associated with the decoders $221_1$ to $221_N$, respectively, and uses the accumulated key information for performing the decoding.

Figure 18:
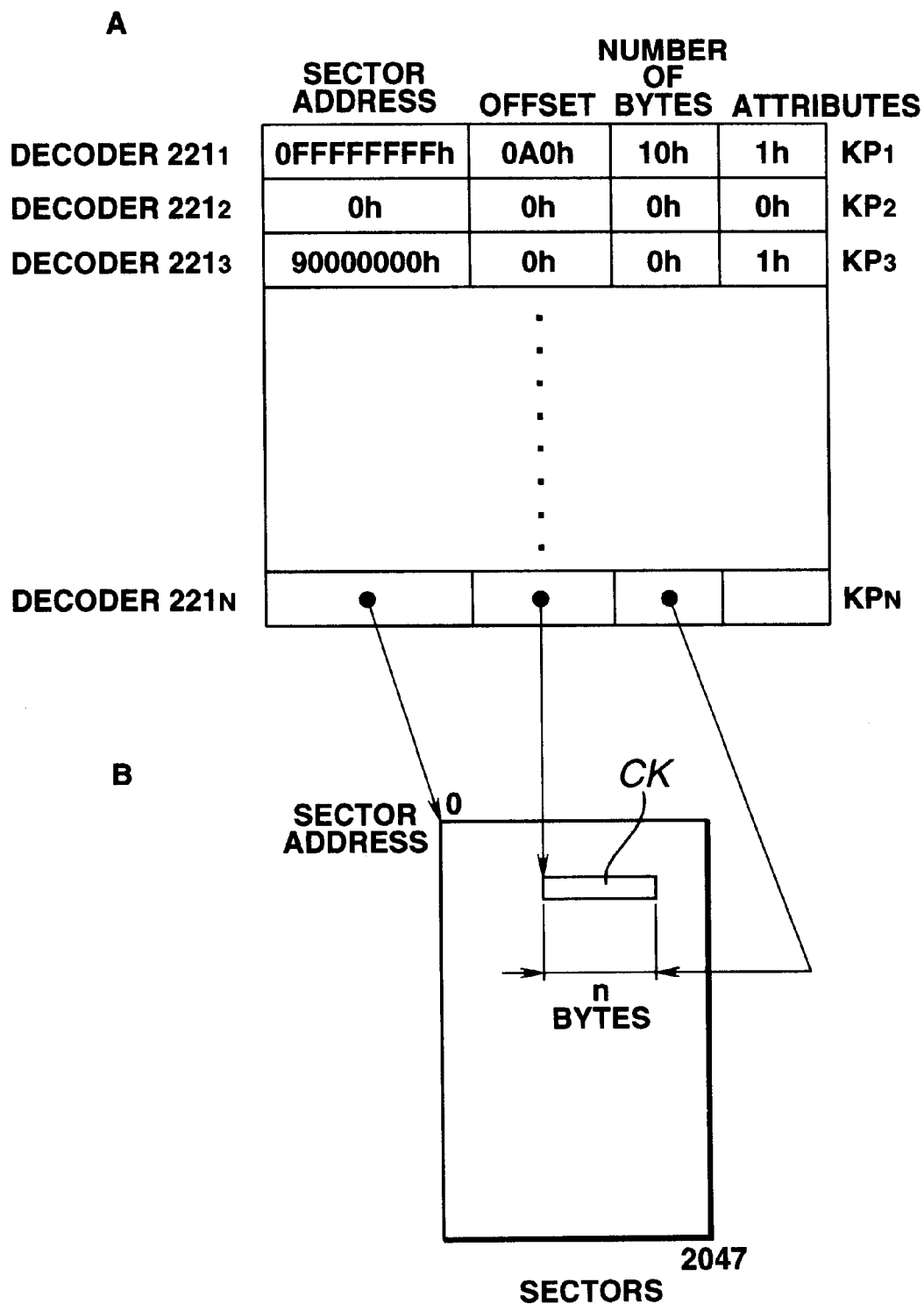
FIG. 18 illustrates a table for the key storage position information.
Figure 19:
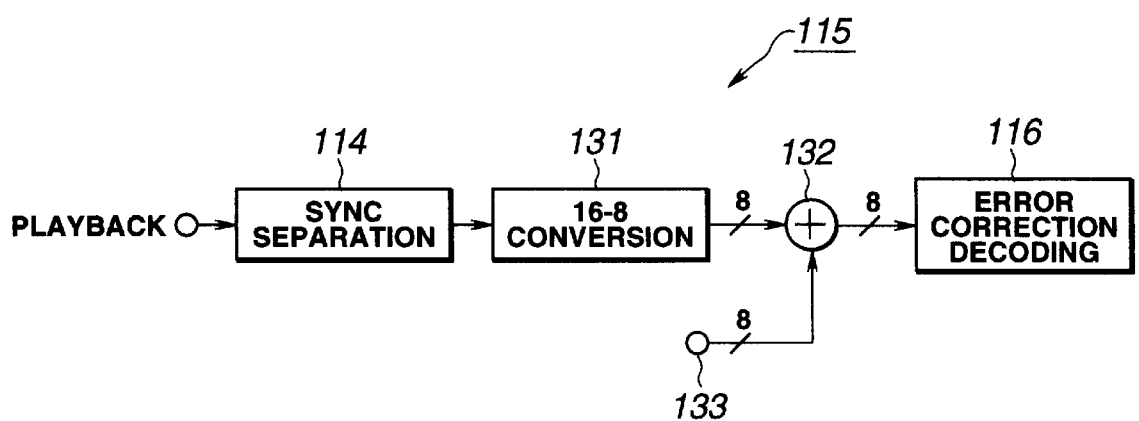
FIG. 19 illustrates an example of encryption by a demodulation circuit.

To this end, the key storage site information $KP_1$ to $KP_N$ having the data structure shown in FIG. 18 for each of the decoders $221_1$ to $221_N$ in the digital signal processing circuit 220. The key storage site information $KP_1$ to $KP_N$ is arranged in the TOC area in the record medium 101.

The key storage site information $KP_1$ to $KP_N$ is made up of the sector address information, offset information, byte number information and the attribute information, as shown in FIG. 18. That is, the key storage site information $KP_1$ to $KP_N$ specifies that the encryption key information CK necessary for deciphering by a decoder is stored at a position specified by the offset information (byte specified by the offset information as,from the leading byte) in bytes of a length specified by the byte number information. Meanwhile, the attribute information may be the information concerning the use or non-use of the decoders $221_1$ to $221_N$ or the like information.

The decoding processing flow in the reproducing apparatus of FIG. 16 in case of using the key storage site information is now explained.

Each time the disc-shaped recording media 101 are exchanged, the reproducing apparatus of FIG. 16 resets all of the decoders $221_1$ to $221_N$ and the encryption key information accumulation circuits $222_1$ to $222_N$, while setting all sector addresses of the disc-shaped record medium 101 to an accessible mode.

The reproducing apparatus then reads out the key storage site information $KP_1$ to $KP_N$ from the TOC area of the disc-shaped record medium 101 and judges whether or not the decoder in subject is being used based on the attribute information shown in the entries of the decoders $221_1$ to $221_N$ in the key storage site information $KP_1$ to $KP_N$. If the decoder is used, the sector contents specified in the sector address information as the key storage site are read. The case in which special addresses are written will be explained subsequently. The information of a range shown by the offset information and the byte number information is read out from this sector to take out the encryption key information. The encryption key information is then accumulated in an encryption key information accumulating unit 222 and set in the decoder 221 to complete preparation for deciphering, that is for expression in plain language. The above sequence of operations is repeated in all decoders $221_1$ to $221_N$. The reproducing apparatus then transfers to a user access area limiting mode.

The reproducing apparatus accepts the user command and accordingly reads out user data to solve the encryption of the user data based on the encryption key information accumulated in the encryption key information accumulation unit 222.

The key information, the storage site therefore and the key storage site information will now be explained.

Since the sector addresses specified by the sector address information can cover all sectors on the disc-shaped record medium 101, if the sector address information is represented in twos complement form with 4 bytes, and an area used in a system such as TOC area is in (0ffffffffh), the identification information contained therein and inherently written for other purposes, such as for recording the production hysteresis, may be designated as the encryption key information. For example, if the production hysteresis information is recorded in 16 bytes beginning at the 160th byte as from the leading end of the sector in the TOC area, the offset information is 160th byte and the byte number information is 16 bytes, the production hysteresis identification information can be designated accordingly.

If a negative value such as (0ffffffff0h) is set as the sector address, and the encryption key information written in the user inaccessible area, such as in the lead-in area, the encryption key can be hidden from the user.

If the disc-shaped record medium 101 has plural record layers, and the sector addresses of a record layer other than the data record layer of the disc-shaped record medium 101 is set so as to be decreased from, for example, (7fffffffh), the encryption key information contained in the first sector of the record layer other than the data record layer on the record medium 101 can be specified by designating (7fffffffh) as the sector address information.

As an example of the case in which special addresses are written in the sector address information, if the sector address numbers not present on the disc-shaped record medium 101, such as the numbers from (90000000h) to (0effffffh), are allocated to the following information items, a variety of information items can be handled as the encryption key information by sector addresses in a unified form of representation.

In such case, the key information from the usual sector is not read out, but the information written by bar codes, wobbling or ultraviolet rays, the identification information proper to the recording/reproducing apparatus or the destination information (Regional Code) representing the territory of the shipping destination, recorded in, for example, an EEPROM 225 in the apparatus shown in FIG. 16, the information accumulated in a information accumulation unit 226, such as an IC card or a Personal Computer Card International Association (PCMCIA), connected to or enclosed in the apparatus, the information supplied via a communication interface 227 from a communication device such as MODEM/LAN, or the information from an external device, supplied from a keyboard 228 or a remote controlled transmission device 232 via a remote controlled reception unit 229, is taken out as the identification information.

If, when the key storage site information is read out, it is designated in the sector address information as the above-mentioned sector address (90000000h) to use the information contained in the bar code BC recorded on the surface of the disc-shaped record medium 101, a bar code reader 210 provided separately from the usual readout device is actuated for decoding the information from the reader 210 by a bar code decoder 233 and the decoded information is sent to the CPU 224 for setting the key information in the decoder as previously explained.

If an interactive input device, such as keyboard 228, remote controlled transmitter 232 or remote controlled reception unit 229, is designated as the encryption key storage site, a step of prompting the user to enter the encryption key using an indication circuit 230 and a display 231 enclosed in or connected to the apparatus needs to be provided before the step of reading out the key information.

If such special sector address is used, the meaning proper to the information or the device.can be accorded to the byte number information or the offset information for the key storage site information for absorbing differences between the devices. If the encryption key information is designated to be read from the modem, the offset information may be used for designating the telephone number of the encryption key information distributor.

As another example of deciphering using the encryption key information, if there are a decoder A capable of decoding from one sector to another and a decoder B capable of decoding from one record medium to another, the operation of setting the encryption key in the sector-based decoder A after reading out the encryption key from the decoder A may be carried out before the operation of taking out the encryption key of the decoder B for further raising confidentiality of the encryption key of the decoder B.

In the above description, plural encryption operations are performed in the recording apparatus, and a plurality of associated decoders are provided in the reproducing apparatus. It is to be noted however that the present invention can be applied basically to an arrangement having a sole encryption operation and the associated decoder.

With the above-described embodiment of the present invention, one or more site(s) for the encryption key information is provided in association with the decoder(s) of the apparatus, and a pointer specifying such site (key storage site information) is recorded on the record medium for enabling the site(s) of the encryption key information to be flexibly designated at an optional site on the record medium. For example, it becomes possible to improve the confidentiality of the encryption key information by designating the user inaccessible site as the encryption key storage site. In addition, if the optional identification information prescribed by the physical format is designated, or if a physical property of the record medium, such as a different record layer of a record medium having plural record layers, is designated, the deterrent potential against unauthorized duplication can be increased. In addition, since plural encryption keys are grouped in one sector, high-speed accessing becomes possible with respect to a large number of encryption keys.

With the key information designated by the key storage site information, not only a data area on the record medium read out by usual readout means, but also the information recorded on the record medium by a different recording method may also be designated. In addition, since the key information specified by the key storage site information can designate a site on the record medium, but also logical devices ancillary to the recording/reproducing apparatus, it becomes possible to designate the internal information in the recording/reproducing apparatus, such as identification numbers or to cope with entry of the encryption key from external devices.

Also, the key information combination can be changed from one master disc for the record medium to another, so that the record medium can be easily fabricates in conformity to the intention of the master disc producer. For example, only a part of the key information may be used in order to exploit the characteristics of the decoders of the reproducing apparatus.

Of course, such method may be applied to a key information in encryption techniques in general. The deciphering operation in respective components of FIG. 17 is now explained.

The deciphering operation by the synchronization separation circuit 114 of FIG. 17 is performed by detecting data in which the manner of using a plurality of, such as four, different types of the synchronization words, or the sites of using various synchronization words in the frame structure, are ciphered, or otherwise changed depending on the key information in accordance with the key information, in accordance with the key information, as explained in connection with FIG. 13 or 14.

The deciphering operation by the demodulation circuit 115 is performed in such a manner that 16 channel-bit data is sent from the synchronization separation circuit 114 to a 16-8 conversion circuit 131 for conversion to 8-bit data, which is then sent to an ExOR gate 132 associated with the ExOR gate 73 of FIG. 12 so as to be ExORed with the 8-bit key data from a terminal 133. This restores data corresponding to 8-bit data supplied to an input terminal 71 of FIG. 12. The resulting data is then sent to the error correction decoding circuit 116.

Figure 20:
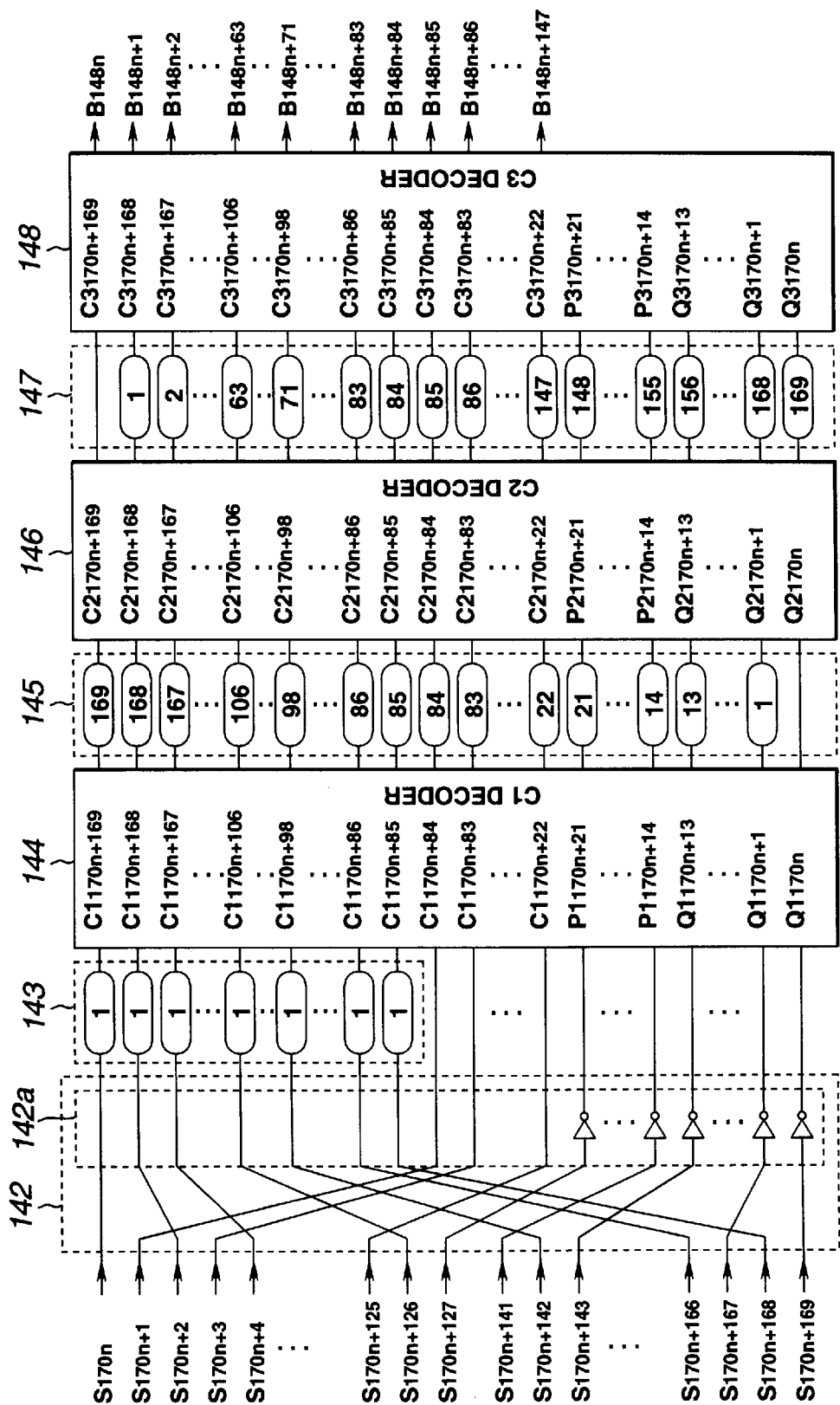
FIG. 20 illustrates an example of an error correction decoding circuit.

The error correction decoding circuit 116 performs an operation, which is reverse of the operation of the error correction encoding circuit of FIG. 10, by an arrangement shown in FIG. 20.

Referring to FIG. 20, 170 bytes or 170 symbols of data demodulated by the demodulation circuit 115 are grouped together and sent via a re-arraying circuit 142 having an inverter 172a and a delay circuit 143 to a C1 decoder 144 operating as a first decoder. Of the 170-byte data supplied to the C1 decoder 144, 22 bytes represent the P and the Q parity data. The C1 decoder 144 performs error correction and decoding using these parity data. The C1 decoder 144 outputs 170 byte data which is sent via a delay circuit 145 to a C2 decoder 146, where the 170 byte data is processed with error correction and decoding before being sent via a delay circuit 147 to a C3 decoder 148 operating as a third decoder. The delay circuit 147 and the C3 decoder 148 are similar to the delay circuit 143 and the C1 decoder 144. It is also possible to provide plural sets of the delay circuits and the C1 decoders. The C3 decoder 148 performs ultimate error correction and decoding, so that 148-byte data free of parity data is taken out. The 148-byte data corresponds to the 148 byte data entering the C1 encoder 52 of FIG. 10.

If encryption by the presence or absence of the inverter is performed in the inverters 57a in the re-arraying circuit 57 of the error correction encoding circuit of FIG. 10, it becomes necessary to perform corresponding deciphering by inverters 142a within the re-arraying circuit 142 of the error correction decoding circuit of FIG. 20. Of course, the deciphering operation needs to be performed as a counterpart operation of the ciphering operations explained in connection with FIG. 10.

Figure 21:
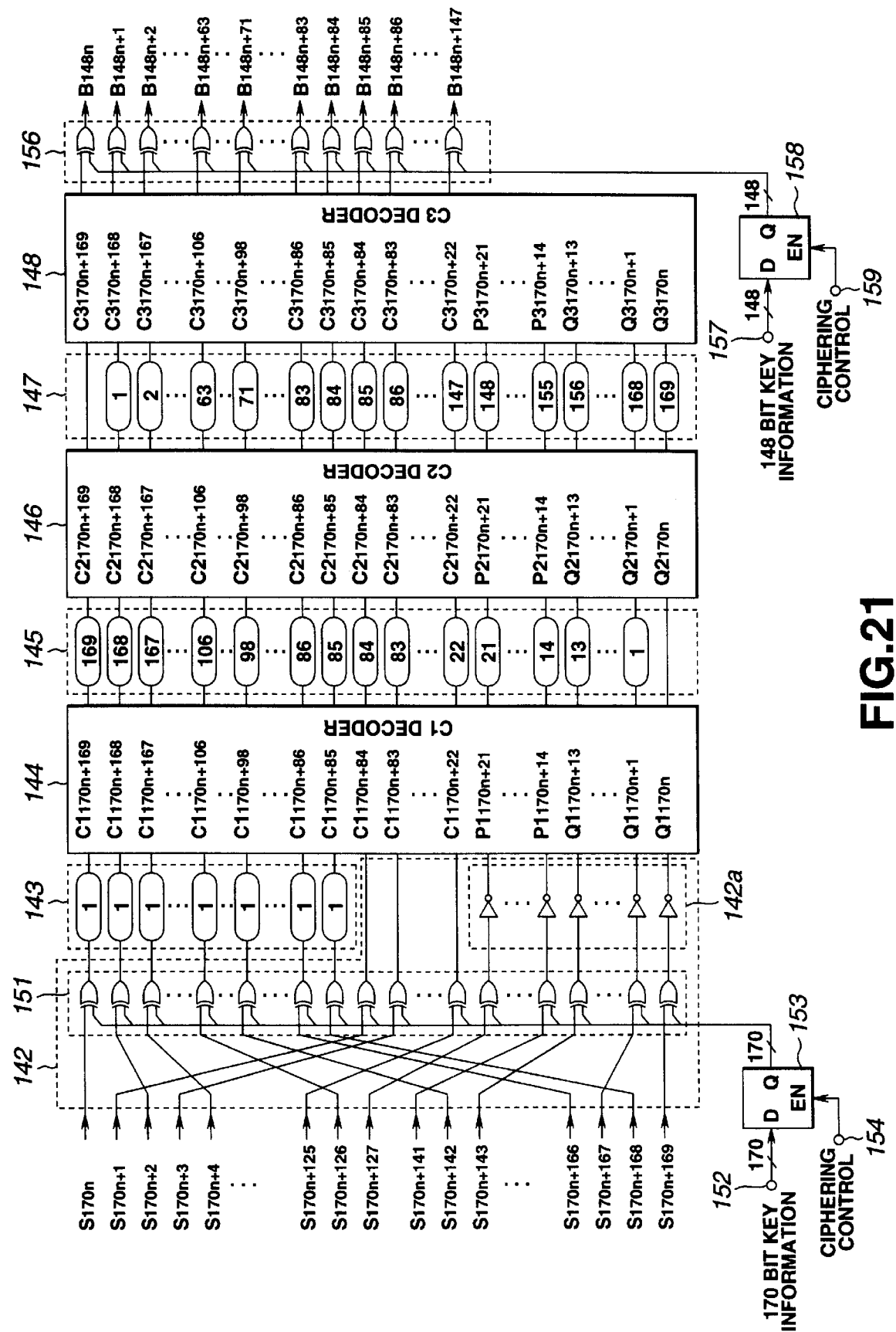
FIG. 21 illustrates another, example of an error decoding circuit.

FIG. 21 shows an illustrative arrangement of an error correction decoding circuit associated with the error correction encoding circuit of FIG. 11. Referring to FIG. 21, a set of ExOR gates 151 is provided on the input side of the inverters 142a of the re-arraying circuit 142 and on the input side of the delay circuit 143, in association with the set of the EXOR gates 61 inserted on the output side of the inverters 57a in the re-arraying circuit 57 in FIG. 11. Similarly, a set of ExOR gates 156 is provided on the output side of the C3 decoder 148 in association with the set of the ExOR gates 66 inserted on the input side of the C3 decoder 148.

These sets of the ExOR gates 151, 156 perform data conversion for deciphering the data converted by the EXOR gates 61, 66 of FIG. 1, respectively, and are made up of 170 8-bit ExOR gates and 148 8-bit ExOR gates, respectively. Of course, if the set of ExOR gates 61 on the recording side shown in FIG. 1 perform data conversion corresponding to the key information on 148-byte information data excluding the parity data, the set of ExOR gates 151 are constituted by 148 8-bit ExOR gates.

To an input terminal 152 of FIG. 21 is supplied the 170-bit key information, corresponding to the key information supplied to the terminal 62 of FIG. 11. The 170-bit key information is then supplied via a D-latch circuit 153 to each of 170 ExOR gates within the set of ExOR gates 151. The D-latch circuit 153 is responsive to the 1-bit encryption control signal supplied to an enabling terminal 154 to send the 170-bit key information directly to the set of ExOR gates 151 or to set the 170 bits to "0". The set of ExOR gates 156 is similar to the set of ExOR gates 151 except for having 148 ExOR gates and the 148-bit key data similar to that supplied to the terminal 67 of FIG. 11. Thus, the 148-bit key information supplied to the terminal 157 is sent via a D-latch circuit 158 to 148 ExOR gates in the set of ExOR gates 156, while the D-latch circuit 158 is controlled by the encryption control signal at the enabling terminal 159 as to whether or not the 148-bit key information should all be set to zero.

By employing the ExOR gates or the inverters of the error correction circuit, sophisticated encryption may be achieved in a simple manner. By controlling the number of the inverters, data of absolutely undecipherable level or data which become non-reproducible with worsening of the error rates can be coped with responsive to the demand in the security level. That is, by controlling the number of the inverters or the ExOR gates, control may be managed in such a manner that reproduction becomes feasible and unfeasible if the error state is good or bad, respectively, while the absolutely non-reproducible state, that is the state in which data recovery is impossible if only error correction is resorted to, can be produced. The encryption key is formed by a large number of bits, such as more than one hundred bits for each site, as in the example shown in the drawing, thus improving data security. In addition, by forming the error correction encoding circuit or the error correction decoding circuit in an LSI or IC chip hardware, the circuits become difficulty accessible to the users in general, thus again improving data security.

Figure 3:
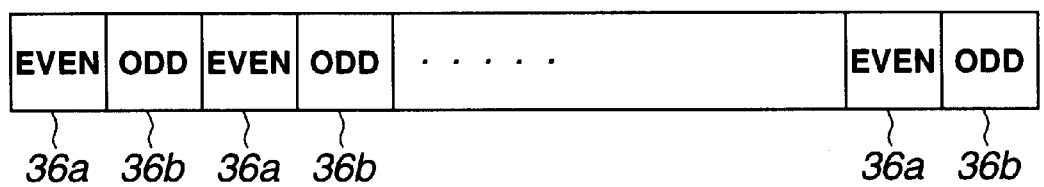
FIG. 3 illustrates an even and odd byte interleaving.
Figure 3:
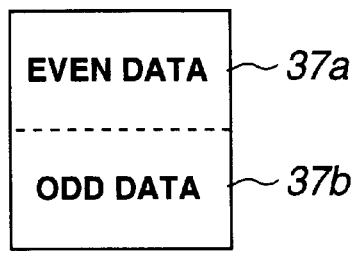
Figure 3:
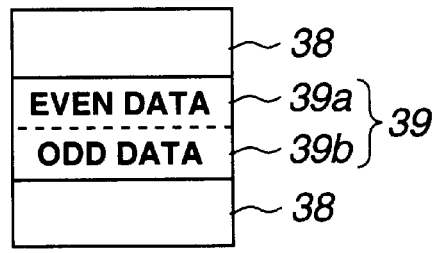

The sector resolution circuit 117 performs even/odd deinterleaving, that is resolves interleaving of even-numbered bytes and odd-numbered bytes, if such interleaving has been performed by the sector forming circuit 13 at the time of recording, as already explained in connection with FIGS. 2 and 3.

The header separation circuit 118 performs deciphering, that is resolving the ciphering explained in connection with FIGS. 7 to 9, that is transposition of byte patterns of data sync for sector synchronization or changes in addresses or CRC, if such ciphering is performed by the header appendage circuit 15 at the time of recording.

Figure 22:
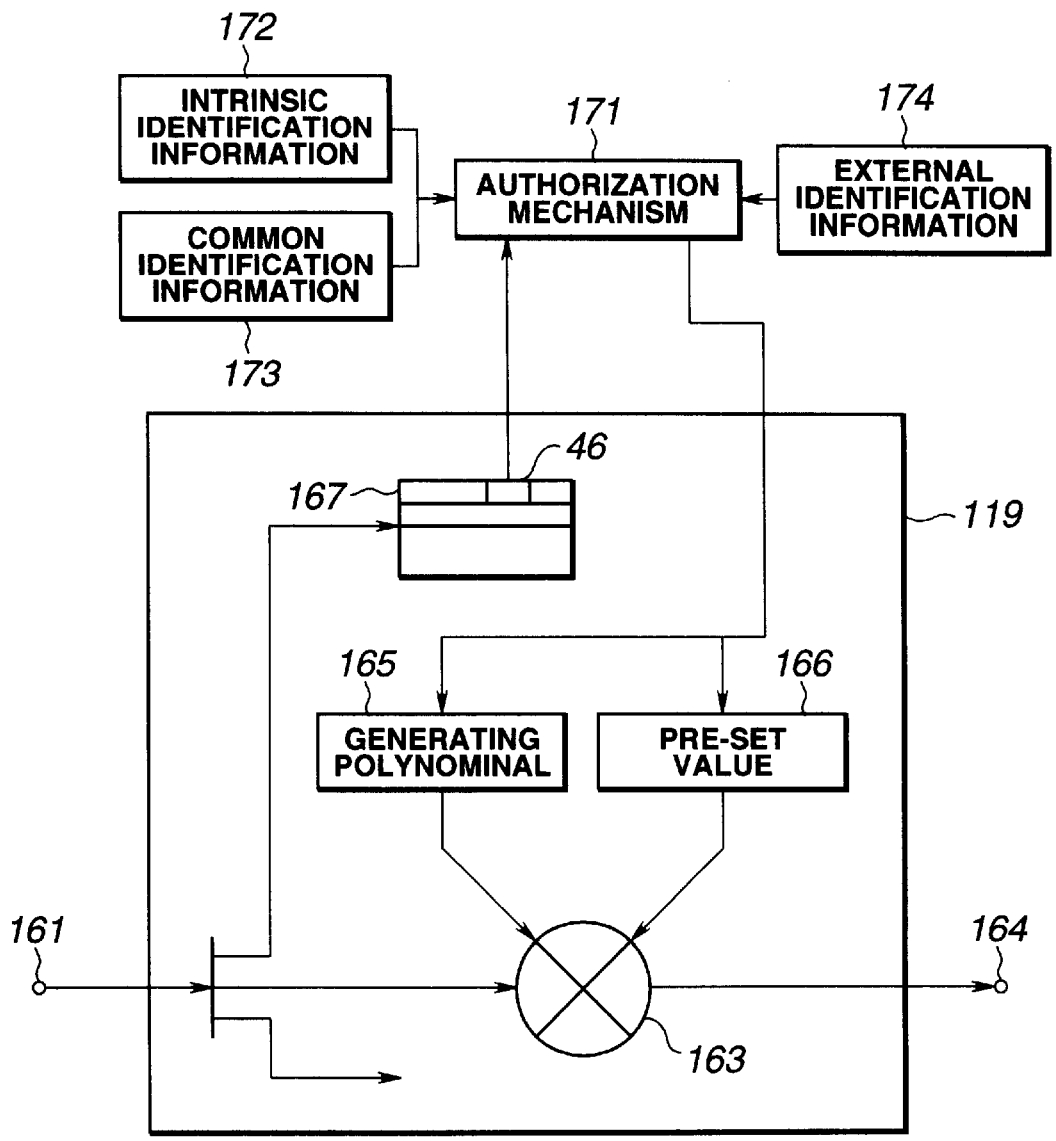
FIG. 22 illustrates an example of a descrambling circuit.

FIG. 22 shows an illustrative structure of a descrambling circuit 119, to a terminal 161 of which digital data from the header separation circuit 118 of FIG. 17 is supplied. The digital data from the terminal 161 is descrambled by a scrambler 163 configured as shown for example in FIG. 4 and is outputted at an output terminal 164. A generating polynomial.165 and pre-set values (initial values) 165 for the scrambler 163 are varied responsive to the encryption key information from a verification mechanism 171 for effectuating deciphering. The verification mechanism 171 generates the encryption key information, based on the contents of the copying information 46 of the header information 167, the proper identification information 172 proper to the record medium or to the reproducing apparatus, the common producer or seller identification information 173, or the external identification information 174 supplied from outside, for controlling the generating polynomial 165 or the pre-set values 166 responsive to the key information.

The information as to which of the circuits 114 to 119 is in need of deciphering also constitutes the encryption key information, as explained previously. The encryption key information may be switched at a pre-set period, for example, at a sector period. The switching/non-switching or the switching period may also constitute the key for encryption, thus enhancing encryption.

A second embodiment of the present invention will now be explained.

The present second embodiment represents partial modification of the first embodiment and has an overall structure similar to that explained above in connection with FIG. 1. The modified portions of the circuits 13 to 18 of FIG. 1 will now be explained.

The sector forming circuit 13 of FIG. 1 may be constituted similarly to the corresponding circuit of the first embodiment. However, the scrambling circuit 14 is configured as shown in FIG. 23.

Figure 23:
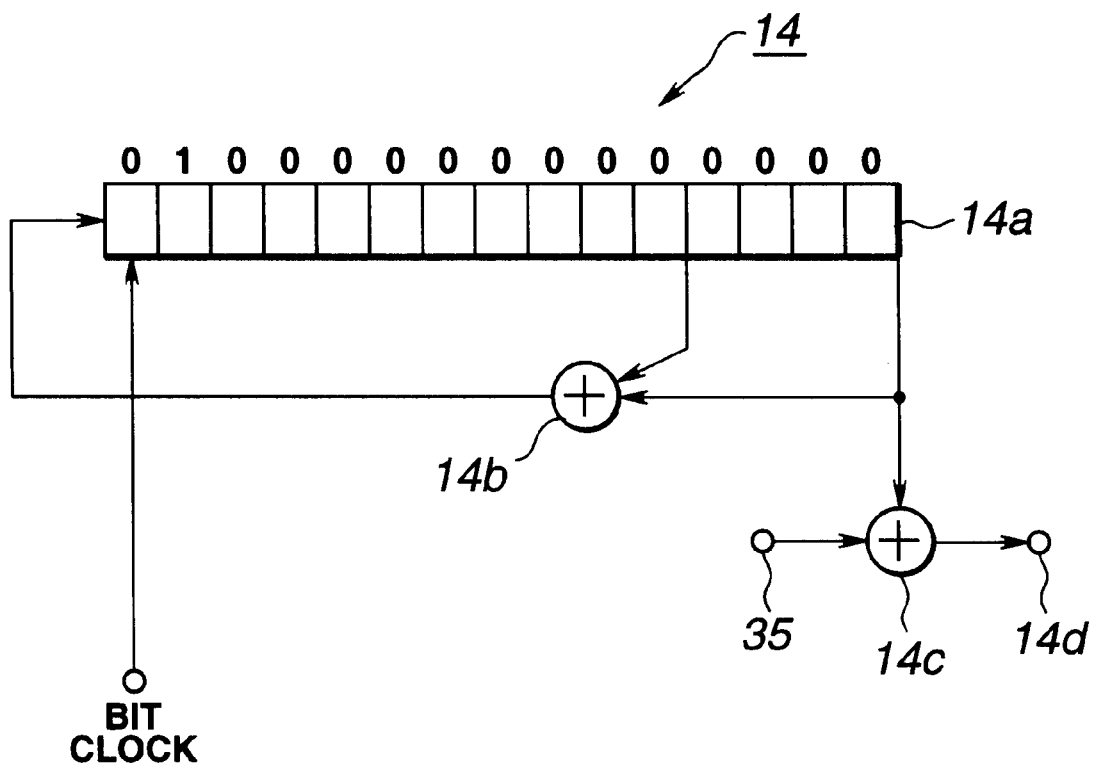
FIG. 23 illustrates another example of a descrambler.

In the scrambling circuit 14, shown in FIG. 23, data from the sector forming circuit 13 of FIG. 1 are entered in the so-called LSB first sequence, that is in a sequence in which the lowermost bit (LSB) is entered temporally first. A 15-bit shift register 14a for scrambling is associated with an ExOR gate 14b for feedback in accordance with the generating polynomial $x^{15}+x^4+1$. Pre-set values or initial values as shown in FIG. 24 are set in the 15-bit shift register 14a. The selection numbers for the pre-set values of FIG. 24 are associated with, for example, the lower four bits of the sector addresses so that the pre-set values are switched on the sector basis. Output data of the shift register 14a and input data from a terminal 35 are ExORed by the ExOR circuit 14c, an output of which is sent via a terminal 14d to the header appendage circuit 15 of FIG. 1.

The pre-set values (initial values) may be changed responsive to the key information, such as the pre-set identification number. For example, pre-set logical operations may be performed on the byte values of the 16-byte identification information and the preset values of the table in FIG. 24. The identification information may include the identification information proper to the record medium, the producer identification information, seller identification information, the identification information proper to the recording apparatus or the encoder, or the identification information supplied from outside, alone or in combination.

Figure 25:
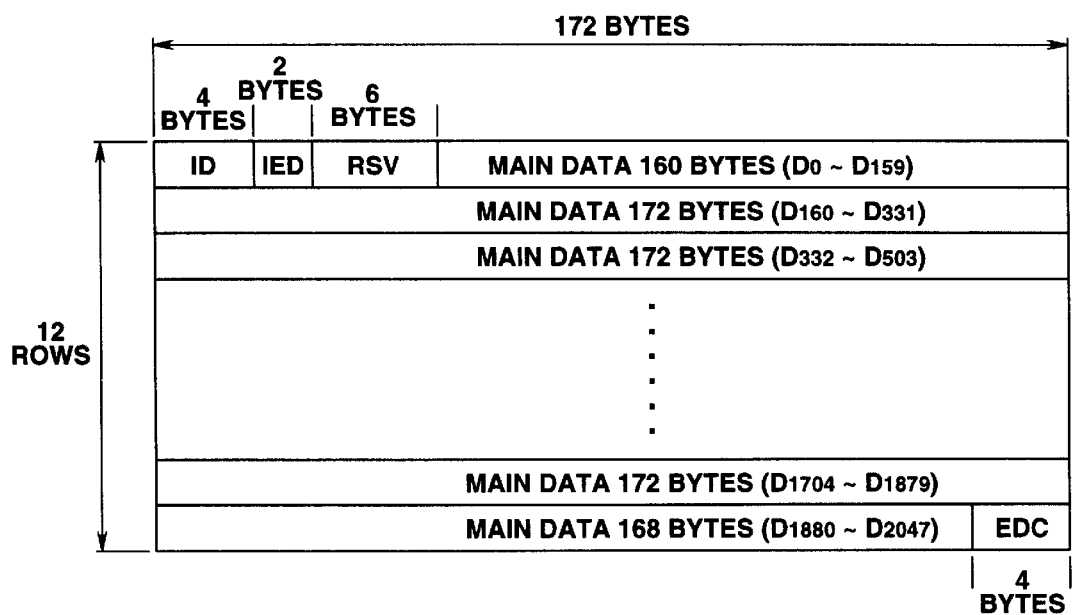
FIG. 25 shows another example of a sector format.

The sector format of the present second embodiment may be configured as shown for example in FIG. 25.

Referring to FIG. 25, each sector is made up of 12 172-byte rows, totalling at 2064 bytes, of which 2048 bytes represent main data. At the leading end of the first row of the 12 rows are a 4-byte identification (ID) data, a 2-byte ID error detection (IED) code and a 6-byte reserve (RES) data, in this order. At the trailing end of the last row is arranged a 4-byte error detection code (EDC).

Figure 26:
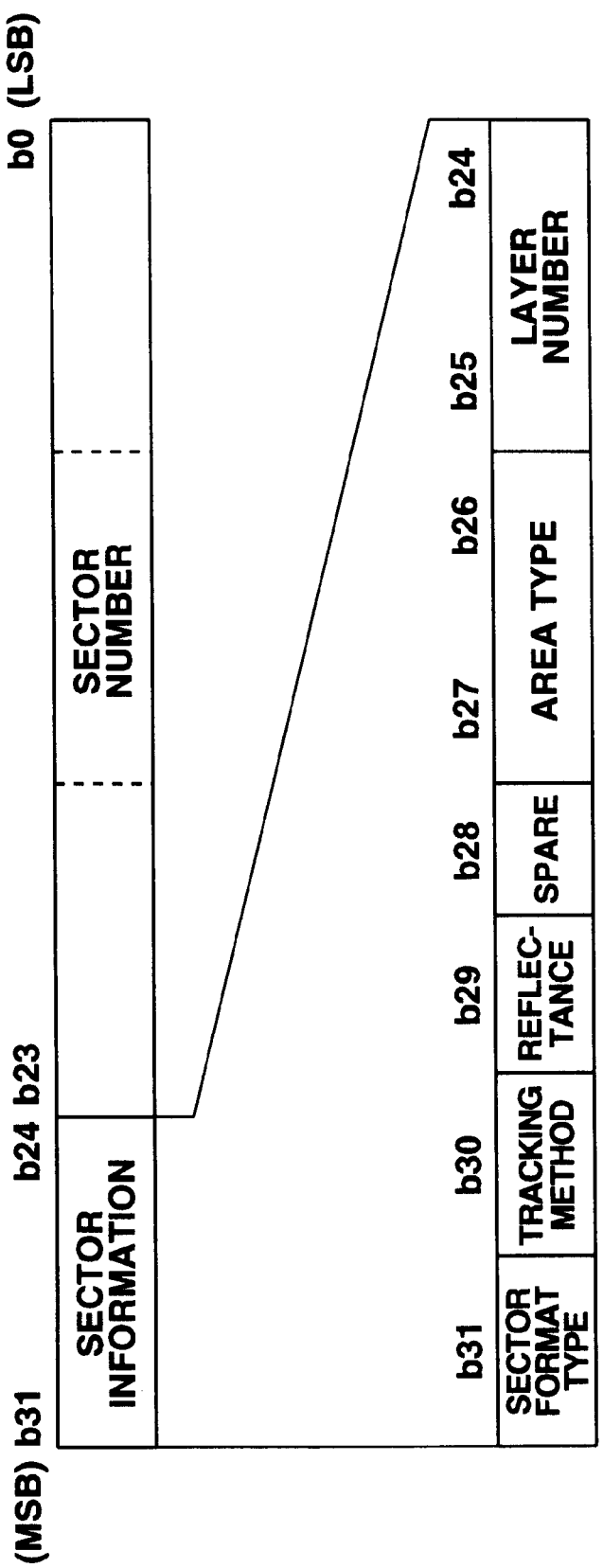
FIG. 26 illustrates an example of a header area in a sector in the sector format of FIG. 23.

Of the 4 bytes of the ID data, the first byte (bits b31 to b24) on the MSB side represents the sector information, with the remaining three bytes (bits b23 to b0) representing the sector numbers, as shown in FIG. 26. The sector information is made up of a 1-bit sector format type, a 1-bit tracking method, a 1-bit reflectance, a 1-bit spare, a 2-bit area type and a 2-bit layer number, looking from the MSB side.

The header appendage circuit 15 of FIG. 1 may perform transposition, which is bit-based scrambling, on 24 bits of the sector number in the ID data, for example, depending on the key information, by way of performing encryption. Alternatively, the generating polynomial for 2-byte ID error detection (IED) code or the generating polynomial for 4-byte error detection code (EDC) may be modified depending on the key information, or processed with the key information with logical operations by way of performing encryption.

Figure 27:
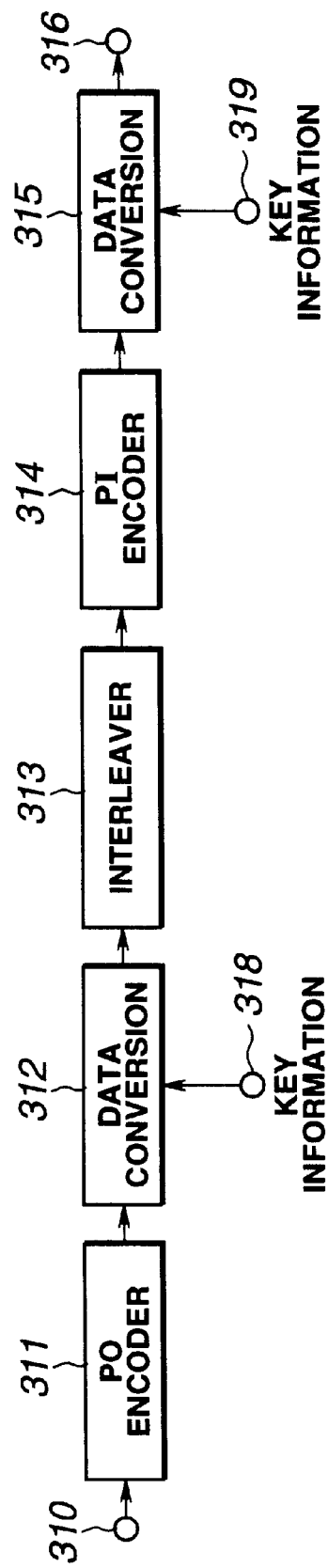
FIG. 27 illustrates another example of an error correction encoding circuit.
Figure 28:
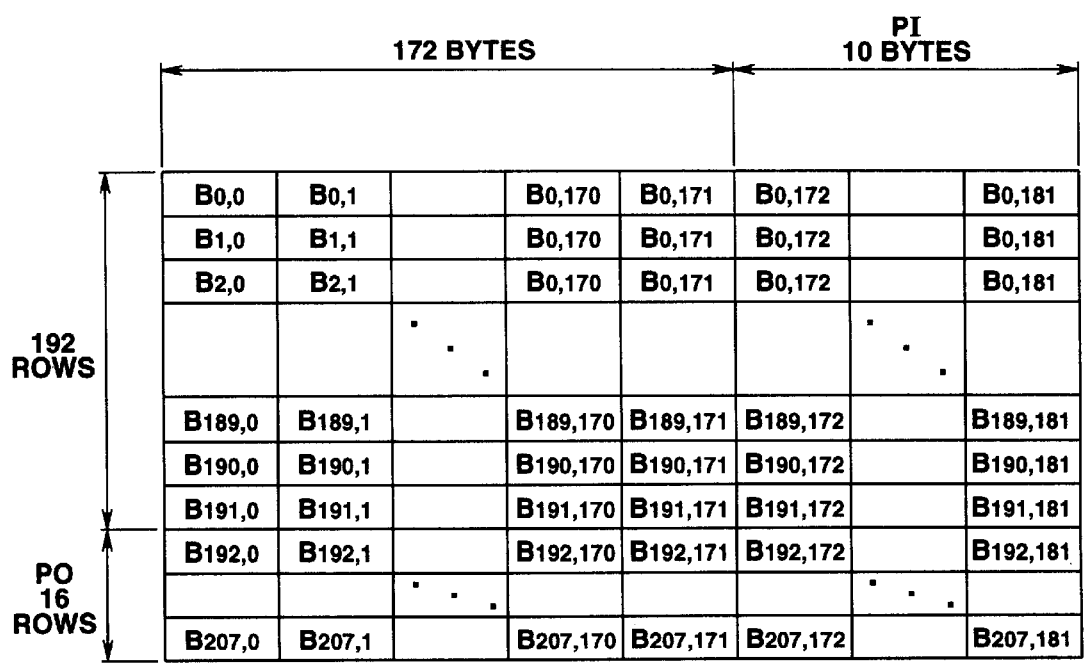
FIG. 28 illustrates a product code as an embodiment of an error correction code.

The error correction coding circuit 16 of FIG. 1 may be configured as shown in FIG. 27. For encoding, the product code or the block code as shown in FIG. 28 is employed.

Referring to FIG. 27, data from the header appendage circuit 15 of FIG. 1 is supplied to an input terminal 310 and then supplied to a PO encoder 311 as a first encoder. The input data to the PO encoder 311 is data of 172 bytes by 192 rows, or $B_{0,0}$ to $B_{191,171}$, as shown in FIG. 28. The PO encoder 311 appends the 16 bytes of the outer code (PO) of RS (208, 192, 17) as the Reed Solomon (RS) code to each of the 172 columns each made up of 192 bytes of data. Output data of the PO encoder 311 are sent via a data conversion circuit 312 for encryption to an interleaving circuit 313 for interleaving and then to a PO encoder 314. The PI encoder 314 appends 10 bytes of the inner code (PI) of RS (182, 172, 11) to 172-byte data of each of 208 rows of 172 bytes by 208 rows of data resulting from appendage of the PO parity data. Thus the PI encoder 314 outputs 182 bytes by 208 rows of data, which is taken out at an output terminal 316 via a data conversion circuit 315 for encryption such as the one described previously.

Since the PO encoder 311 appends 16-byte PO parity to 192-byte input data of each column to output 208 bytes of data, the data conversion circuit 312 can perform the above-described data conversion on the 16-byte parity or the 208 bytes of the data in its entirety by way of performing encryption. Also, since the PI encoder 314 appends 10-byte PI parity to 172-byte input data of each row to output 182 bytes of data, the data conversion circuit 315 can perform the above-described data conversion on the 10-byte parity or the 182 bytes of the data in its entirety by way of performing encryption.

Specifically, the inverters may be arranged at pre-set positions, data inversion may be made selectively depending on the key information by the sets of the ExOR gates, or AND, OR, NAND or NOR gates may be used for data conversion, as shown and explained in connection with in FIGS. 10 and 11. In place of performing logical operations on the 8-bit based data with the 1-bit key information or key data, logical operations may be performed on 8-bit information data and 8-bit key data. Each bit of the 8 bits of the information data word may be associated with an AND, OR, ExOR, NAND, NOR or inverter circuits. If the AND, OR, ExOR, NAND, NOR or the inverter circuits are used in combination, the combination itself may be used as the key for encryption. Of course, a variety of encryption techniques such as conversion by shift registers or function operations may also be used alone or in combination.

Figure 29:
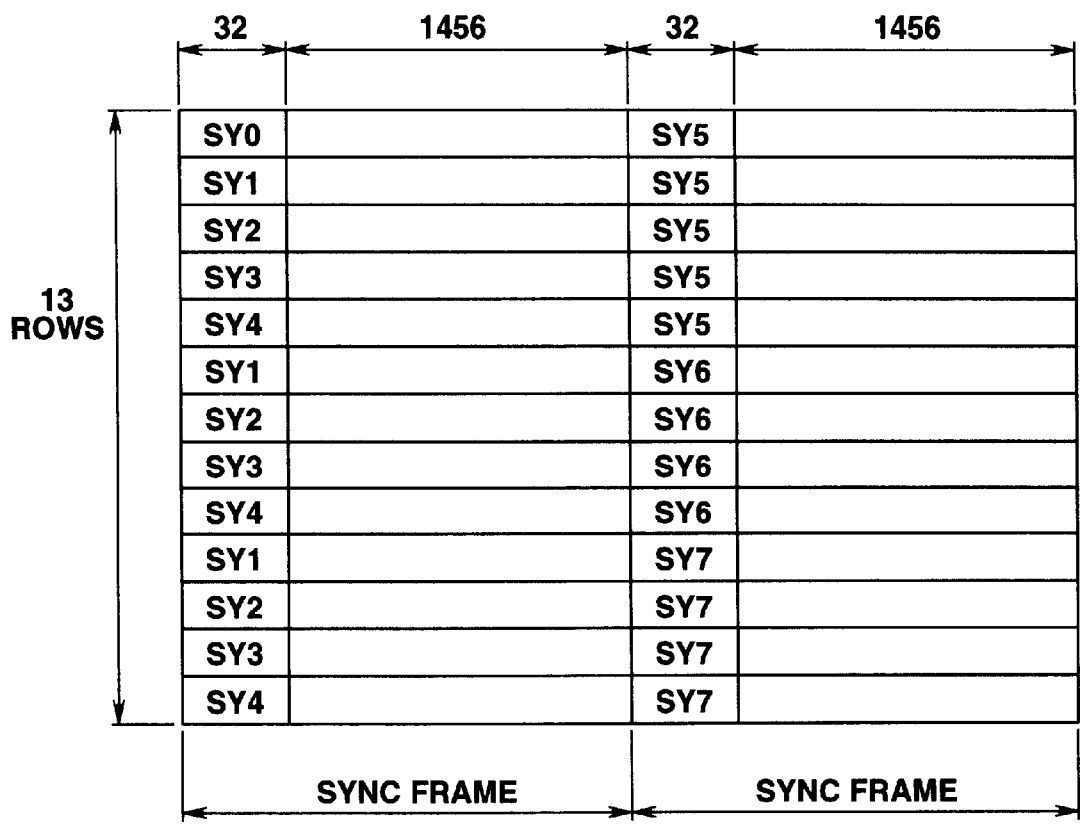
FIG. 29 illustrates an example of a sector signal format.

The 182 bytes by 208 rows of the error-corrected and encoded data are interleaved as to rows and classified into 16 groups each made up of 13 rows, with each group being associated with a recording sector. Each sector is made up of 182 bytes by 13 rows, totalling 2366 bytes, which are modulated, and two synchronization codes SY per row are appended to the modulated data, as shown in FIG. 29. For modulation, 8–16 conversion is used, as in the first embodiment previously explained. Each row is divided into two sync frames, each sync frame being made up of a 32 channel bit synchronization code SY and a 1456 channel bit data portion. FIG. 29 shows a one-sector structure produced as modulation and synchronization appendage. The 38688 channel bits for one sector shown in FIG. 29 correspond to 2418 bytes prior to modulation.

The modulated output signal of FIG. 29 uses eight types of the synchronization codes SY0 to SY7. Depending on the states of the above-mentioned 8 to 16 conversion, these synchronization codes SY0 to SY7 assume the synchronization pattern of FIG. 30A for states 1 and 2, while assuming the synchronization pattern of FIG. 30B for states 3 and 4.

Figure 31:
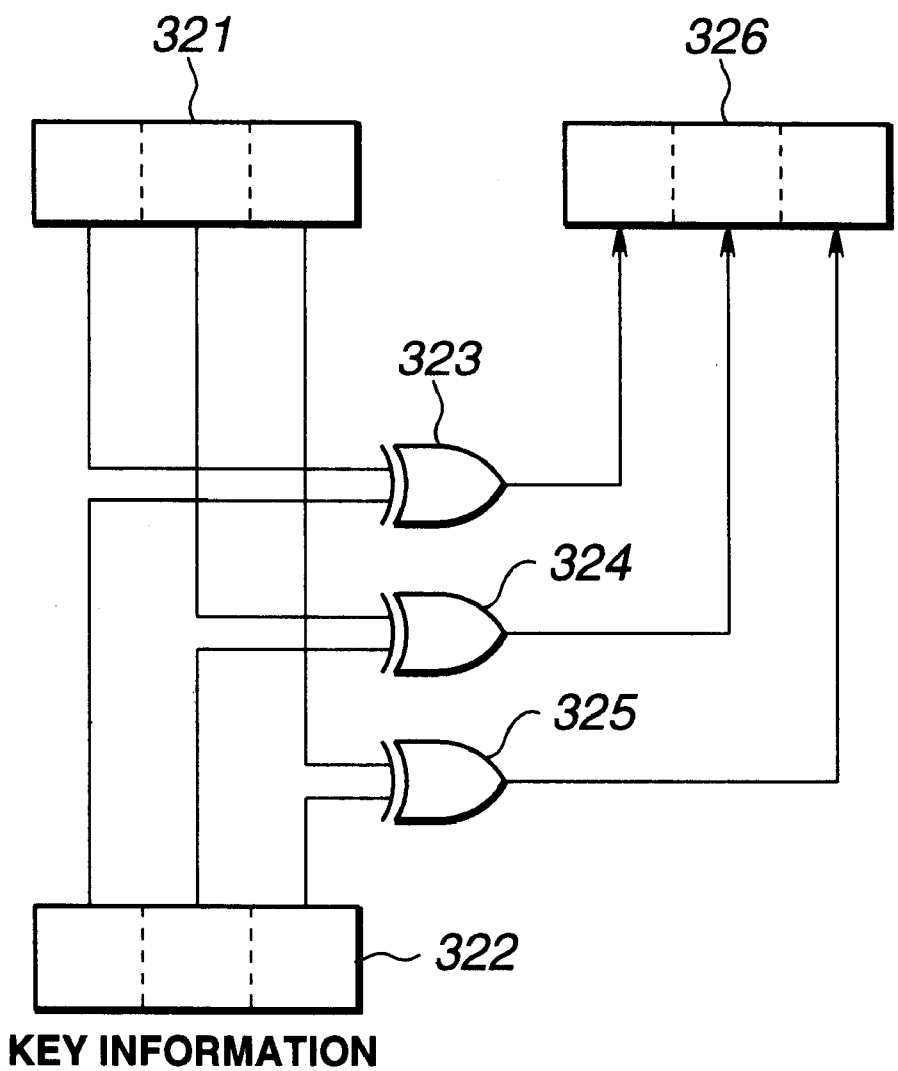
FIG. 31 illustrates another example of encryption by a synchronization appendage circuit.

Selection of these 8 types of the synchronization codes SY0 to SY7 may be varied, depending on the 3-bit key information, using the circuit shown for example in FIG. 31, by way of performing encryption. That is, each of three bits specifying the above eight types of the synchronization codes SY0 to SY7 is ExORed with each of three bit of the key information 322 by three ExOR gates 323, 324, 325 for providing a new synchronization code designating data 326. This modifies the manner of using the synchronization codes in the above frame structure or the use position of the various synchronization codes in the frame structure by way of performing encryption. Of course, the three bit data may be transposed or substituted depending on the key information. It is also possible to effect conversion by shift registers or by functions.

The effect of the second embodiment of the present invention is also similar to that of the second embodiment described above.

For the recording side structure of the above-described second embodiment of the present invention, the basic structure of the reproducing side is explained in connection with FIG. 17. That is, the reverse operations modified in association with the points of change shown in the second embodiment are performed. For example, the reverse operation of the error correction encoding shown in FIG. 27 may be implemented by an error correction decoding circuit shown in FIG. 32.

Figure 32:
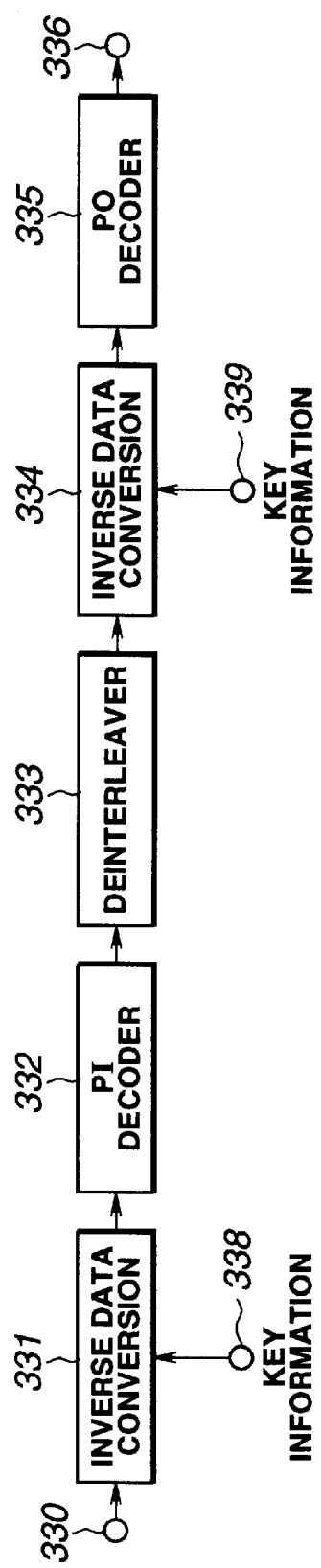
FIG. 32 is a block diagram showing another example of an error correction decoding circuit.

To an input terminal 330 of FIG. 32 are supplied data of 182 bytes by 208 rows of the product code of FIG. 28 corresponding to an output of an output terminal 316 of FIG. 27. The data entering the input terminal 330 are sent to an inverse data conversion circuit 331 where the operation which is a reverse of the operation by the data conversion circuit 315 of FIG. 27 is performed. Output data of the inverse data conversion circuit 331 is sent to a PI (inner code) decoder 332 where a decoding operation which is the reverse of the operation by the PI encoder 314 of FIG. 27, that is error correction coding employing the PI code, is performed to give data of 172 bytes by 208 rows as shown in FIG. 28. Output data of the PI decoder 332 is sent to a deinterleaving circuit 333 where the operation which is the reverse of the interleaving performed by the interleaving circuit 313 is performed. The deinterleaved data is sent to an inverse data conversion circuit 334 where an operation which is the reverse of the operation by the data conversion circuit 312 of FIG. 27 is performed. The resulting data is sent to a PO (outer code) decoder 335 where a decoding operation which is the reverse of the operation by the P0 encoder 311, that is the error correction employing the PO code is performed. The resulting data, that is the original 172 bytes by 192 rows of data, is taken out at an output terminal 336. If the key information is used for data conversion by the data conversion circuits 312, 315 of FIG. 27, the key information supplied to the terminals 318, 319 may be supplied. to terminals 339, 338 of the inverse data conversion circuits 334, 331 for performing inverse data conversion depending on the key information.

The effect of the second embodiment of the present invention is similar to that of the above-described first embodiment.

The present invention is not limited to the above-described merely illustrative embodiments. For example, data conversion may be made by bit addition or data conversion by a variety of logical operations, in place of inverters or ExOR gates as described above. Various encryption techniques, such as data substitution, transposition or transformation by a shift register or by various function processing, responsive to the encryption key information, may also be used alone or in combination.

What is claimed is:

1. Signal recording apparatus for recording an enciphered signal on a recording medium, comprising:
    means for producing encryption key information;
    a number of signal processing means for processing an input signal to be recorded to said recording medium, each of the signal processing means enciphering user data represented by said input signal, and at least one of the signal processing means enciphering said user data by using said encryption key information to generate said enciphered signal representing said user data; and
    means for recording to said recording medium said enciphered signal and key storage information containing location information of said encryption key information as used by said one of the signal processing means, said location information specifying whether said encryption key information has been recorded to said recording medium or whether said encryption key information has been stored to a storage other than said recording medium, said key storage information further containing attribute information for specifying which of the signal processing means has enciphered said user data.

2. The apparatus according to claim 1, wherein said key storage information is recorded to a portion of said recording medium to which said user data does not have access.

3. The apparatus according to claim 1, further comprising means for enciphering said encryption key information using another encryption key information, wherein information specifying a location of said another encryption key information is recorded to said recording medium.

4. Signal reproducing apparatus for reproducing and deciphering from a recording medium an enciphered signal having been recorded on said recording medium by signal recording apparatus including means for producing encryption key information, said signal recording apparatus further including a number of signal processing means for processing an input signal to be recorded to said recording medium, each of the signal processing means enciphering user data represented by said input signal, and at least one of the signal processing means enciphering said user data by using said encryption key information to generate said enciphered signal representing said user data, said signal recording apparatus further including means for recording to said recording medium said enciphered signal and key storage information containing location information of said encryption key information as used by said one of the signal processing means, said location information specifying whether said encryption key information has been recorded to said recording medium or whether said encryption key information has been stored to a storage other than said recording medium, said key storage information further containing attribute information for specifying which of the signal processing means has enciphered said user data, said signal reproducing apparatus comprising:
    readout means for reading out said enciphered signal and said key storage information from said recording medium; and
    means for deciphering said enciphered signal using said encryption key information and said attribute information obtained from said key storage information.

5. The signal reproducing apparatus according to claim 4, wherein said readout means reads out said key storage information from a portion of said recording medium to which said user data does not have access.

6. The signal reproducing apparatus according to claim 4, further comprising means for obtaining said encryption key information from said storage other than said recording medium.

7. The signal reproducing apparatus according to claim 4, wherein said encryption key information has been enciphered using another encryption key information and information specifying a location of said another encryption key information has been recorded to said recording medium, said readout means reading out said information specifying said location of said another encryption key information.

8. A recording medium, comprising:
    a first recording area for recording key storage information; and
    a second recording area for recording an enciphered signal which has been obtained by processing an input signal by a number of signal processing means to be recorded to said second recording area, each of the signal processing means enciphering user data represented by said input signal and at least one of the signal processing means enciphering said user data by using encryption key information to generate said enciphered signal representing said user data, said key storage information containing location information of said encryption key information being used by signal reproducing apparatus to decipher said enciphered signal, said location information specifying whether said encryption key information has been recorded to said recording medium or whether said encryption key information has been stored to a storage other than said recording medium, said key storage information further containing attribute information for specifying which of the signal processing means has enciphered said user data.

9. The recording medium according to claim 8, wherein said user data does not have access to said first recording areas.

10. The recording medium according to claim 8, wherein said encryption key information has been enciphered using another encryption key information prior to recording to said recording medium, and wherein said recording medium contains information specifying a location of said another encryption key information.

* * * * *